United States Patent
Kato et al.

(10) Patent No.: US 8,732,395 B2
(45) Date of Patent: May 20, 2014

(54) WRITE-ONCE INFORMATION RECORDING MEDIUM, INFORMATION RECORDING METHOD, INFORMATION RECORDING DEVICE, INFORMATION REPRODUCTION METHOD, INFORMATION REPRODUCTION DEVICE AND METHOD FOR MANUFACTURING INFORMATION RECORDING MEDIUM

(75) Inventors: Hisae Kato, Osaka (JP); Yoshihisa Takahashi, Osaka (JP); Motoshi Ito, Osaka (JP)

(73) Assignee: Panasonic Corporation, Osaka (JP)

(*) Notice: Subject to any disclaimer, the term of this patent is extended or adjusted under 35 U.S.C. 154(b) by 115 days.

(21) Appl. No.: 13/392,937

(22) PCT Filed: Sep. 16, 2010

(86) PCT No.: PCT/JP2010/005668
§ 371 (c)(1),
(2), (4) Date: Feb. 28, 2012

(87) PCT Pub. No.: WO2011/036859
PCT Pub. Date: Mar. 31, 2011

(65) Prior Publication Data
US 2012/0159065 A1    Jun. 21, 2012

(30) Foreign Application Priority Data
Sep. 24, 2009 (JP) .............................. 2009-219543

(51) Int. Cl.
G06F 12/00    (2006.01)
(52) U.S. Cl.
USPC ............. 711/112; 711/E12.007; 711/E12.078
(58) Field of Classification Search
None
See application file for complete search history.

(56) References Cited

U.S. PATENT DOCUMENTS 7,203,153 B2    4/2007 Kuraoka et al.
7,516,273 B2 *  4/2009 Park .............................. 711/112
(Continued)

FOREIGN PATENT DOCUMENTS

CN    1864206 A    11/2006
EP    2375417 A1   10/2011
(Continued)

OTHER PUBLICATIONS

Notice of Allowance for co-pending U.S. Appl. No. 12/886,636 mailed Apr. 12, 2012.
(Continued)

*Primary Examiner* — Edward Dudek, Jr.
*Assistant Examiner* — Christopher Birkhimer
(74) *Attorney, Agent, or Firm* — Renner, Otto, Boisselle & Sklar, LLP

(57) ABSTRACT

In an information recording medium in which storage capacity per recording layer has increased so much that the size of an SBM varies with those of spare areas, there is mutual dependence between a DDS and an SBM and it is difficult to retrieve disc management information as intended. In an information recording medium according to the present invention, if the largest space is allocated to an user data area, the number of blocks to store a space bitmap is $N_i$ (where $N_i \geq 2$). But if the smallest space is allocated to the user data area, the number of blocks to use is smaller than Ni. In such an information recording medium, if the number of blocks to store the space bitmap of a recording layer is $M_i$ (where $1 \leq M_i \leq N_i$) and if $M_i$ is equal to or greater than two, the space bitmap is divided into the $1^{st}$ through $M_i^{th}$ space bitmaps, each of which has a size that is still equal to or smaller than one block even when combined with a DDS, and each space bitmap is stored in an associated one of $M_i$ blocks in a disc management area.

5 Claims, 15 Drawing Sheets

(56) References Cited

U.S. PATENT DOCUMENTS

| | | |
|---|---|---|
| 7,573,795 B2 * | 8/2009 | Hwang et al. ............. 369/53.17 |
| 2003/0137909 A1 | 7/2003 | Ito et al. |
| 2004/0165496 A1 | 8/2004 | Park et al. |
| 2004/0179458 A1 | 9/2004 | Hwang et al. |
| 2004/0193947 A1 * | 9/2004 | Park et al. ........................ 714/6 |
| 2005/0083815 A1 | 4/2005 | Park |
| 2006/0239161 A1 | 10/2006 | Takahashi et al. |
| 2010/0246364 A1 | 9/2010 | Takahashi et al. |
| 2010/0329098 A1 | 12/2010 | Takahashi et al. |

FOREIGN PATENT DOCUMENTS

| | | |
|---|---|---|
| JP | 2004-013276 A | 1/2004 |
| JP | 2007-042277 A | 2/2007 |
| JP | 2007-509453 T | 4/2007 |
| JP | 4224391 B | 11/2008 |
| JP | 2008-293571 A | 12/2008 |
| WO | 2010/079572 A1 | 7/2010 |
| WO | WO 2010/079578 A1 | 7/2010 |

OTHER PUBLICATIONS

International Search Report for corresponding International Application No. PCT/JP2010/005668 mailed Dec. 28, 2010.

Co-pending U.S. Appl. No. 12/886,636, filed Sep. 21, 2010.

Extended European Search Report for European Application No. 10818539.8, dated Oct. 7, 2013.

Chinese Search Report for corresponding Chinese Patent Application No. 201080033487.3 dated Jan. 2, 2014 with English translation.

* cited by examiner (A)

(B)

WRITE-ONCE INFORMATION RECORDING MEDIUM, INFORMATION RECORDING METHOD, INFORMATION RECORDING DEVICE, INFORMATION REPRODUCTION METHOD, INFORMATION REPRODUCTION DEVICE AND METHOD FOR MANUFACTURING INFORMATION RECORDING MEDIUM

TECHNICAL FIELD

The present invention relates to a write-once information recording medium, which includes bitmap information indicating whether each area has already been recorded or has not been recorded yet and on which a random write operation can be performed, and also relates to a method and apparatus for reading and/or writing from/to such a recording medium.

BACKGROUND ART

Recently, various removable information recording media with huge storage capacities and disc drives for handling such media have become immensely popular. Examples of known removable information recording media with big storage capacities include optical discs such as DVDs and Blu-ray Discs (which will also be referred to herein as "BDs"). An optical disc drive performs a read/write operation by making tiny pits (or marks) on a given optical disc using a laser beam, and therefore, can be used effectively to handle such removable information recording media with huge storage capacities. Specifically, a red laser beam is used for DVDs, while a blue laser beam, having a shorter wavelength than the red laser beam, is used for BDs, thereby making the storage density and storage capacity of BDs higher and greater than those of DVDs. As for a BD-R, for example, a maximum storage capacity of as much as 27 gigabytes (GB) per recording layer has been realized.

For example, there is an optical disc that uses a phase change type recording material for its recording layer. A phase change type optical disc is irradiated with a laser beam and the atomic bonding state of a thin-film substance, which has been deposited on its recording layer, is locally varied with the energy injected, thereby writing information there. Also, when irradiated with a laser beam with much lower power than the one used for recording, the optical disc has its reflectance varied due to such a difference in physical condition. And if the magnitude of such a variation in reflectance is detected, the information stored there can be read out.

Phase change type optical discs include rewritable optical discs, on which information can be rewritten a number of times by using a phase change type recording material for its recording layer, and write-once optical discs, on which information can be written only once. If a mark edge write operation is performed on such a write-once optical disc, the disc is irradiated with a laser beam that has been modulated into a multi-pulse train to vary the physical condition of the recording material, thereby recording marks there. And information is read out from such a write-once optical disc by sensing a variation in reflectance between those recorded marks and spaces left between the marks.

However, as an optical disc is a removable information recording medium, probably there will be some defect on its recording layer due to the presence of dust or a scratch. Among other things, the higher the density of a recording medium, the more easily the recording medium will be affected by defects. That is why it has become a more and more common measure to take to carry out a defect management on not just rewritable optical discs (such as a BD-RE) but also write-once optical discs (such as a BD-R) as well to ensure the reliability of the data read or written (see Patent Document No. 1, for example).

FIG. 1 shows the arrangement of various areas on a write-once information recording medium (e.g., a dual-layer BD-R in this case).

Hereinafter, the arrangement of areas will be described with the dual-layer BD-R shown in FIG. 1 taken as an example.

On a BD-R, a read/write operation is performed on the basis of a block, which is an error correction unit and which is also called a "cluster". One cluster consists of 32 sectors (each of which includes user data of 2048 bytes). Sectors are sometimes called "data frames", too.

A write operation on a BD-R may be performed in either of the following two modes. One of the two is a sequential recording mode in which the write operation is performed continuously in a direction in which addresses increase from a certain point to which some data needs to be added. The other mode is a random recording mode in which the write operation is performed on arbitrary locations (i.e., unrecorded clusters). In the following example, however, the write operation is supposed to be performed in the random recording mode.

Each recording layer consists of an inner zone, a data area and an outer zone, which are arranged in this order from the inner edge of the BD-R toward its outer edge. In the following description, one of the two recording layers that has a lead-in area will be referred to herein as "L0 layer" and the other recording layer with a lead-out area as "L1 layer". In a BD-R, the L0 and L1 layers are arranged in this order so that the L0 layer is located more distant from the laser beam incident surface than the other L1 layer.

On the innermost zone of the L0 layer, there is a control information area (which is called a "permanent information and control data (PIC) area). That control information area is defined as a read-only area while the disc is being manufactured. In the control information area, may be stored the type of that information recording medium (which may be BD-R or a BD-RE, for example), the number of recording layers included, disc's storage capacity-related information (including the first and last physical addresses of the data area of each recording layer, the channel bit length, and the nominal writing speed) and other kinds of disc information.

The data area of each recording layer consists of a user data area to write user data on and spare areas to provide a replacement for any defective part of the user data area.

Two spare areas are allocated to form inner and outer parts of the data area. One spare area that forms the inner part of the data area is called an "inner spare area (ISA)", while the other spare area that forms the outer part of the data area is called an "outer spare area (OSA)".

As shown in FIG. 1, TDMAs (including TDMA2, TDMA3, TDMA4 and TDMA5 in this case), which store disc management information and are sometimes called "additional temporary disc management areas (ATDMAs)", may be allocated to the ISAs and OSAs. In the following description, however, such an ISA or OSA with an ATDMA will be regarded herein as forming together a single spare area.

The spare area may have any arbitrary size, which is set during formatting (initialization) processing, thereby determining the layout of the disc (i.e., the respective sizes of the user data area and the spare areas).

In addition, four disc management areas (DMAs) to store management information are arranged in total for the inner and outer zones.

FIG. 12 shows the arrangement of a DMA of the dual-layer BD-R.

As shown in FIG. 12(A), each of DMA1 through DMA4 consists of 64 blocks (=32 blocks×2 layers). Also, to ensure compatibility between BD-Rs and BD-REs, DMA1 through DMA4 are arranged at the same set of locations in both of these two types.

The first eight blocks of each DMA form an area to store disc management information, including the disc's layout information and information about recording statuses. On the other hand, the other 56 blocks thereof form an area to store defect management information including information about the locations of defects and their replacements.

In the dual-layer BD-R, four pieces of disc management information, each consisting of a disc definition structure (DDS) including disc's layout information (i.e., information about its format and status) and a space bitmap (SBM) indicating the recording status of the user data area, are arranged on a block-by-block basis in the first four blocks of each DMA.

All of these four DDSs store the same piece of information. As for the SBMs, on the other hand, L0 layer SBM and L1 layer SBM are stored alternately to manage the recording statuses of the user data areas on a recording layer basis.

To ensure compatibility with BD-REs, the remaining four blocks (i.e., the fifth through eighth blocks) are reserved and unrecorded (see Patent Document No. 2 and Patent Document No. 3.

In a sequential recording mode, the recording statuses are managed by reference to sequential recording range information (SRRI) instead of the SBMs. Each user data area is divided into more than one sequential recording range (SRR). And by reference to the SRRI, the start address and the last recorded address of each SRR are managed as SRR entries, thereby managing the recording status of the user data area. In that case, the same piece of disc management information consisting of the DDS and the SRRI is written on each of those four blocks (i.e., the same number of blocks as that of the blocks with the SBMs) repeatedly on a block-by-block basis.

On the other hand, the same piece of defect management information (that forms a defect list) is written seven times on an eight block basis.

The same information is written on each of DMA1 through DMA4 (see FIG. 1). This is because if no management information could be retrieved from the DMAs, the read/write operation could not be carried out. That is why with the same piece of information written there multiple times, even if management information cannot be retrieved from any of those DMAs due to the presence of some defect such as dust or dirt, management information can still be retrieved from another one of the DMAs.

The same disc management information and the same defect management information are written a number of times for quite the same reason.

FIG. 13 shows the data structure of the DDS of the dual-layer BD-R.

The DDS is master information for use to manage a disc and is one sector of information including what needs to be used to define the arrangement of areas on the disc and to control the management information (i.e., slave information) such as the defect management information and SBMs.

Examples of those pieces of information that define the arrangement of areas on the disc include pieces of information about the sizes 1303, 1304 and 1305 of the spare areas, the logical last sector address 1302 of the user data area, and the ATDMA's sizes 1307, 1308 and 1309. On the other hand, examples of those pieces of information to control the management information include pieces of information about the recording mode 1306, DFL location information 1310 and 1311 indicating the locations where the DFLs are stored, and SBM location information 1312 and 1313 indicating the locations where the SBMs are stored.

As for the sizes of the spare areas, the sizes of three different kinds of areas, namely, the L0 layer inner spare area, outer spare areas, and L1 layer inner spare area, can be set. Specifically, the L0 layer inner spare area size 1303 indicates the size of ISA0 (see FIG. 1), the outer spare area size 1304 indicates the size of OSA0 and OSA1, and the L1 layer inner spare area size 1305 indicates the size of TSA1.

Just like the sizes of the spare areas, the sizes of three different kinds of ATDMAs, namely, the L0 layer inner ATDMA, outer ATDMAs, and L1 layer inner ATDMA, can be set. Specifically, the L0 layer inner ATDMA size 1307 indicates the size of TDAM2 (see FIG. 1), the outer ATDMA size 1308 indicates the size of TDMA3 and TDMA4, and the L1 layer inner ATDMA size 1309 indicates the size of TDMA5.

On the other hand, the size of the user data area can be determined by pieces of information about the storage capacity of the disc, including the first and last physical addresses of the respective recording layers' data areas that are stored in the PIC and the logical last sector address 1302 of the user data area that is stored in the DDS, and by the spare areas' sizes 1303, 1304 and 1305 that are also stored in the DDS.

In some cases, not all of those spare areas and ATDMAs can be defined only by formatting processing. Then, zeros will be stored in their sizes in the DDS.

Each DFL consists of eight blocks. And to manage the location information of each of those eight blocks, eight pieces of DFL location information are stored. Meanwhile, since the SBMs are managed on a recording layer basis, two pieces of SBM location information are stored for the L0 and L1 layers, respectively (see Patent Document No. 4, for example).

And the DDS header 1301 includes an identifier for use to determine whether this is a DDS or not.

FIG. 2 illustrates the data structure of each SBM.

The SBM 200 includes an SBM header 201 and bitmap information 202 indicating the recording status of the user data area. The SBM 200 is a piece of information to be stored in combination with a DDS of one sector and consists of 31 sectors.

The bitmap information 202 can be used to manage the recording status of the user data area by handling one block of the user data area as one bit and indicating a recorded block as one and an unrecorded block as zero, respectively (see Patent Document No. 2, for example).

The SBM header 201 includes layer information to indicate what recording layer this SBM is intended to manage. The SBM header 201 further includes the first physical address of the area to be managed by reference to the bitmap information 202 and the size of the bitmap information so as to indicate the size of the effective bitmap information and the range of the user data area to be managed by reference to that bitmap information. In addition, the SBM header further includes an identifier indicating whether this is an SBM or not.

And when finalize (also called "disc close") processing is carried out to prohibit the user from newly adding any further piece of information to the disc and make the disc a read-only one, management information indicating the latest state of the disc is written on the DMA.

FIG. 14 shows the arrangement of areas in a temporary disc management area (TDMA) on the dual-layer BD-R.

In the TDMA, the respective data structures of its SBMs, DDSs and DFL themselves are identical with those of the DMA. In the TDMA, however, the DFL is stored in a different number of blocks, each DDS is stored at the last sector of its associated block, and a DDS is also added to the DFL being written, which are some of the differences between the TDAM and the DMA.

A TDMA is an area that is provided to get defect management done on a BD-R, of which the DMAs cannot be overwritten. That is why by adding management information to the TDMA and updating it while the disc is being finalized, defects and the recording status of the disc can be managed.

For that reason, to use the area as effectively as possible and avoid using the area up, nothing but required information is written on the TDMA. Therefore, if there are only a few defects and the DFL needs to cover just four blocks, the information will be written on only those four blocks.

The DDS is written on the last sector of each block so that the latest DDS never fails to be stored on the sector that is located just before the boundary between the recorded and unrecorded areas of the TDMA. In that case, just by searching for the boundary between the recorded and unrecorded areas of the TDMA and scanning the sector that is located just before the boundary that has been found, the latest DDS can be obtained. Likewise, when the DFL is updated, the DDS is written for quite the same reason (see Patent Document No. 1, for example).

In this manner, defect management can get done on a BD-R.

Recently, the storage capacities of optical discs have been further increased year by year. To increase the overall storage capacity of an optical disc, the storage density per recording layer can be increased by shortening marks and spaces to record and the track pitch. Or the overall storage capacity can also be increased by increasing the number of recording layers to be stacked in a disc.

However, if the storage capacity per recording layer is increased by raising the storage density, the size of the user data area should be increased, too. In the sequential recording mode, the SRRI, which is used to manage the recording status of the user data area and which will be stored along with the DDS, is supposed to be managed with the start address and the last recorded address of the SRR. And therefore, the SRRI does not depend on the size of the user data area and the size of the DDS and the SRRI combined is one block.

CITATION LIST

Patent Literature

Patent Document No. 1: Japanese Patent Publication No. 4224391
Patent Document No. 2: Japanese Patent Application Laid-Open Publication No. 2007-42277
Patent Document No. 3: PCT International Application Japanese National Phase Publication No. 2007-509453
Patent Document No. 4: Japanese Patent Application Laid-Open Publication No. 2008-293571

SUMMARY OF INVENTION

Technical Problem

However, the SBM manages the user data area by handling one block of that area as one bit. That is why if the size of the user data area to be managed by the SBM increases, then that of the bitmap information of the SBM also increases.

The SBM can manage as many as 16,384 blocks with the bitmap information of only one sector. If the SBM header has a size of one sector, for example, one block of the disc management information, consisting of the SBM and the DDS, can be used to manage 491,520 blocks. That is why if the storage capacity per recording layer exceeds approximately 32.2 GB, then two or more blocks should be used to store the disc management information.

In addition, the user data area to be managed by the SBM is defined by removing the spare areas from the data area. That is why the size of the user data area depends on the sizes of the spare areas. That is to say, the size of the SBM is also variable with the sizes of the spare areas.

Suppose the storage capacity per recording layer is 35 GB and the maximum sizes of the spare areas ISA0, OSA0/1 and ISA1 are 1 GB, 15 GB and 2 GB, respectively. In that case, if the size of the user data area were maximized (i.e., if the size of every spare area were set to be zero), the user data area would have a size of 35 GB on both of the L0 and L1 layers and the disc management information would have a size of 2 blocks on both of the L0 and L1 layers.

On the other hand, if the size of the user data area were minimized (i.e., if the size of every spare area were maximized), then the user data area would have a size of 19 GB on the L0 layer and a size of 18 GB on the L1 layer and the disc management information would have a size of 1 block on both of the L0 and L1 layers.

Furthermore, if 1 GB were allocated to each of ISA0, OSA0 and OSA1 and 2 GB were allocated to ISA1, then the user data area would have a size of 33 GB and the disc management information area would have a size of 2 blocks on the L0 layer. On the L1 layer, on the other hand, the user data area would have a size of 32 GB and the disc management information would have a size of 1 block.

In this manner, the size of the disc management information varies with the size of the user data area (or those of the spare areas) and is sometimes different between the L0 and L1 layers.

That is to say, the size of the disc management information does depend on the size of the user data area (or those of the spare areas).

However, nobody in the pertinent art has ever proposed a method for controlling the disc management information in such a situation where the size of the bitmap information does vary with that of the user data area (or those of the spare areas) and where the size of the SBM exceeds one block.

It is therefore an object of the present invention to provide a write-once disc information recording medium that can still obtain disc management information even in a situation where the storage capacity per recording layer has increased so much that the size of the SBM varies with those of the spare areas. Another object of the present invention is to provide a method for performing a read/write operation on such a write-once information recording medium.

Solution to Problem

An information recording medium according to the present invention is a write-once information recording medium on which a read/write operation is performed on a block-by-block basis. The information recording medium has $1^{st}$ through $n^{th}$ recording layers (where n is an integer that satisfies n≥1). The $1^{st}$ through $n^{th}$ recording layers have $1^{st}$ through $n^{th}$ user data areas to write user data on. At least one of the $1^{st}$ through $n^{th}$ recording layers has a disc management area to store disc management information about the information recording medium. The disc management information includes a disc definition structure for use to manage the data structure of the information recording medium and $1^{st}$ through $n^{th}$ space bitmaps for use to manage the recording statuses of the $1^{st}$ through $n^{th}$ user data areas. Each of the $1^{st}$ through $n^{th}$ space bitmaps includes bitmap information for use to manage the recording status of its associated one of the $1^{st}$ through $n^{th}$ user data areas on a block-by-block basis. If in a situation where the largest space is allocated to an $i^{th}$ user data area (where i is an integer that falls within the range $1 \le i \le n$), the number of blocks to use to store the $i^{th}$ space bitmap is $N_i$ (where $N_i$ is an integer that satisfies $N_i \ge 2$) and if the number of blocks to use to store the $i^{th}$ space bitmap for the $i^{th}$ user data area of an actual size is $M_i$ (where $M_i$ is an integer that satisfies $1 \le M_i \le N_i$) and if $M_i$ is equal to or greater than two, then the $i^{th}$ space bitmap is divided into the $1^{st}$ through $M_i^{th}$ space bitmaps, each of which has a size that is still equal to or smaller than one block even when combined with the disc definition structure, and stored in an associated one of the $M_i$ blocks in the disc management area.

In one preferred embodiment, the disc definition structure is recorded on the first sector of each of the $M_i$ blocks.

In this particular preferred embodiment, the $M_i$ blocks are consecutive blocks.

In a specific preferred embodiment, n is equal to or greater than two. And $M_{i+1}$ blocks, including the $(i+1)^{th}$ space bitmap for use to manage the recording status of the $(i+1)^{th}$ user data area, start to be written on the block after $(N_i - M_i)$ blocks that follow the $M_i$ blocks.

In this particular preferred embodiment, the disc definition structure is recorded on the first sector of the $(N_i - M_i)$ blocks.

In a more specific preferred embodiment, in the $(N_i - M_i)$ blocks, data of all zeros has been written on every sector except for the sector on which the disc definition structure is recorded.

In another preferred embodiment, the disc definition structure includes $N_1, N_2, \ldots, N_i, \ldots$ and $N_n$ pieces of space bitmap location information indicating the respective locations of blocks on which the $1^{st}$ through $n^{th}$ space bitmaps are storable. As for a block with no space bitmaps, invalid location information is stored as the space bitmap location information.

An information recording method according to the present invention is a method for writing information on a write-once information recording medium on which a read/write operation is performed on a block-by-block basis. The information recording medium has $1^{st}$ through $n^{th}$ recording layers (where n is an integer that satisfies $n \ge 1$). The $1^{st}$ through $n^{th}$ recording layers have $1^{st}$ through $n^{th}$ user data areas to write user data on. At least one of the $1^{st}$ through $n^{th}$ recording layers has a disc management area to store disc management information about the information recording medium. The disc management information includes a disc definition structure for use to manage the data structure of the information recording medium, and $1^{st}$ through $n^{th}$ space bitmaps for use to manage the recording statuses of the $1^{st}$ through $n^{th}$ user data areas. Each of the $1^{st}$ through $n^{th}$ space bitmaps includes bitmap information for use to manage the recording status of its associated one of the $1^{st}$ through $n^{th}$ user data areas on a block-by-block basis. If in a situation where the largest space is allocated to an $i^{th}$ user data area (where i is an integer that falls within the range $1 \le i \le n$), the number of blocks to use to store the $i^{th}$ space bitmap is $N_i$ (where $N_i$ is an integer that satisfies $N_i \ge 2$), and if the number of blocks to use to store the $i^{th}$ space bitmap for the $i^{th}$ user data area of an actual size is $M_i$ (where $M_i$ is an integer that satisfies $1 \le M_i \le N_i$) and if $M_i$ is equal to or greater than two, then the information writing method comprises the step of dividing the $i^{th}$ space bitmap into the $1^{st}$ through $M_i^{th}$ space bitmaps, each of which has a size that is still equal to or smaller than one block even when combined with the disc definition structure, and storing each said space bitmap in an associated one of the $M_i$ blocks in the disc management area.

In one preferred embodiment, the method includes the step of recording the disc definition structure on the first sector of each of the $M_i$ blocks.

In this particular preferred embodiment, the $M_i$ blocks are consecutive blocks.

In a specific preferred embodiment, n is equal to or greater than two. And $M_{i+1}$ blocks, including the $(i+1)^{th}$ space bitmap for use to manage the recording status of the $(i+1)^{th}$ user data area, start to be written on the block after $(N_i - M_i)$ blocks that follow the $M_i$ blocks.

In this particular preferred embodiment, the disc definition structure is recorded on the first sector of the $(N_i - M_i)$ blocks.

In a more specific preferred embodiment, in the $(N_i - M_i)$ blocks, data of all zeros is written on every sector except for the sector on which the disc definition structure is recorded.

In another preferred embodiment, the disc definition structure includes $N_1, N_2, \ldots, N_i, \ldots$ and $N_n$ pieces of space bitmap location information indicating the respective locations of blocks on which the $1^{st}$ through $n^{th}$ space bitmaps are storable. As for a block with no space bitmaps, invalid location information is stored as the space bitmap location information.

An information reproducing method according to the present invention is a method for reading information from a write-once information recording medium on which a read/write operation is performed on a block-by-block basis. The information recording medium has $1^{st}$ through $n^{th}$ recording layers (where n is an integer that satisfies $n \ge 1$). The $1^{st}$ through $n^{th}$ recording layers have $1^{st}$ through $n^{th}$ user data areas to write user data on. At least one of the $1^{st}$ through $n^{th}$ recording layers has a disc management area to store disc management information about the information recording medium. The disc management information includes a disc definition structure for use to manage the data structure of the information recording medium and $1^{st}$ through $n^{th}$ space bitmaps for use to manage the recording statuses of the $1^{st}$ through $n^{th}$ user data areas. Each of the $1^{st}$ through $n^{th}$ space bitmaps includes bitmap information for use to manage the recording status of its associated one of the $1^{st}$ through $n^{th}$ user data areas on a block-by-block basis. If in a situation where the largest space is allocated to an $i^{th}$ user data area (where i is an integer that falls within the range $1 \le i \le n$), the number of blocks to use to store the $i^{th}$ space bitmap is $N_i$ (where $N_i$ is an integer that satisfies $N_i \ge 2$), and if the number of blocks to use to store the $i^{th}$ space bitmap for the $i^{th}$ user data area of an actual size is $M_i$ (where $M_i$ is an integer that satisfies $1 \le M_i \le N_i$) and if $M_i$ is equal to or greater than two, then the $i^{th}$ space bitmap is divided into the $1^{st}$ through $M_i^{th}$ space bitmaps, each of which has a size that is still equal to or smaller than one block even when combined with the disc definition structure, and each said space bitmap is stored in an associated one of the $M_i$ blocks in the disc management area. The information reading method includes the step of retrieving the $i^{th}$ space bitmap from the $M_i$ blocks.

In one preferred embodiment, the disc definition structure is recorded on the first sector of each of the $M_i$ blocks.

In this particular preferred embodiment, the $M_i$ blocks are consecutive blocks.

In a specific preferred embodiment, n is equal to or greater than two. $M_{i+1}$ blocks, including the $(i+1)^{th}$ space bitmap for use to manage the recording status of the $(i+1)^{th}$ user data area, start to be written on the block after $(N_i - M_i)$ blocks that follow the $M_i$ blocks. And the $(i+1)^{th}$ space bitmap is retrieved from the block after the $(N_i-M_i)$ blocks that follow the $M_i$ blocks.

In this particular preferred embodiment, the disc definition structure is recorded on the first sector of the $(N_i-M_i)$ blocks.

In a more specific preferred embodiment, in the $(N_i-M_i)$ blocks, data of all zeros is written on every sector except for the sector on which the disc definition structure is recorded.

In another preferred embodiment, information is retrieved without a break from all of $N_1, N_2, \ldots, N_i, \ldots$ and $N_n$ blocks in the disc management area.

An information recording apparatus according to the present invention is an apparatus for writing information on a write-once information recording medium on which a read/write operation is performed on a block-by-block basis. The information recording medium has $1^{st}$ through $n^{th}$ recording layers (where n is an integer that satisfies n≥1). The $1^{st}$ through $n^{th}$ recording layers have $1^{st}$ through $n^{th}$ user data areas to write user data on. At least one of the $1^{st}$ through $n^{th}$ recording layers has a disc management area to store disc management information about the information recording medium. The disc management information includes a disc definition structure for use to manage the data structure of the information recording medium and $1^{st}$ through $n^{th}$ space bitmaps for use to manage the recording statuses of the $1^{st}$ through $n^{th}$ user data areas. Each of the $1^{st}$ through $n^{th}$ space bitmaps includes bitmap information for use to manage the recording status of its associated one of the $1^{st}$ through $n^{th}$ user data areas on a block-by-block basis. If in a situation where the largest space is allocated to an $i^{th}$ user data area (where i is an integer that falls within the range 1≤i≤n), the number of blocks to use to store the $i^{th}$ space bitmap is $N_i$ (where $N_i$ is an integer that satisfies $N_i≥2$), and if the number of blocks to use to store the $i^{th}$ space bitmap for the $i^{th}$ user data area of an actual size is $M_i$ (where $M_i$ is an integer that satisfies $1≤M_i≤N_i$) and if $M_i$ is equal to or greater than two, then the information writing apparatus divides the $i^{th}$ space bitmap into the $1^{st}$ through $M_i^{th}$ space bitmaps, each of which has a size that is still equal to or smaller than one block even when combined with the disc definition structure, and stores each said space bitmap in an associated one of the $M_i$ blocks in the disc management area.

An information reproducing apparatus according to the present invention is an apparatus for reading information from a write-once information recording medium on which a read/write operation is performed on a block-by-block basis. The information recording medium has $1^{st}$ through $n^{th}$ recording layers (where n is an integer that satisfies n≥1). The $1^{st}$ through $n^{th}$ recording layers have $1^{st}$ through $n^{th}$ user data areas to write user data on. At least one of the $1^{st}$ through $n^{th}$ recording layers has a disc management area to store disc management information about the information recording medium. The disc management information includes a disc definition structure for use to manage the data structure of the information recording medium, and $1^{st}$ through $n^{th}$ space bitmaps for use to manage the recording statuses of the $1^{st}$ through $n^{th}$ user data areas. Each of the $1^{st}$ through $n^{th}$ space bitmaps includes bitmap information for use to manage the recording status of its associated one of the $1^{st}$ through $n^{th}$ user data areas on a block-by-block basis. If in a situation where the largest space is allocated to an $i^{th}$ user data area (where i is an integer that falls within the range 1≤i≤n), the number of blocks to use to store the $i^{th}$ space bitmap is $N_i$ (where $N_i$ is an integer that satisfies $N_i≥2$), and if the number of blocks to use to store the $i^{th}$ space bitmap for the $i^{th}$ user data area of an actual size is $M_i$ (where $M_i$ is an integer that satisfies $1≤M_i≤N_i$) and if $M_i$ is equal to or greater than two, then the $i^{th}$ space bitmap is divided into the $1^{st}$ through $M_i^{th}$ space bitmaps, each of which has a size that is still equal to or smaller than one block even when combined with the disc definition structure, and each said space bitmap is stored in an associated one of the $M_i$ blocks in the disc management area. The information reading apparatus retrieves the $i^{th}$ space bitmap from the $M_i$ blocks.

An information recording medium manufacturing method according to the present invention is a method of making a write-once information recording medium on which a read/write operation is performed on a block-by-block basis. The method includes the steps of: forming $1^{st}$ through $n^{th}$ recording layers (where n is an integer that satisfies n≥1); defining $1^{st}$ through $n^{th}$ user data areas to write user data on in the $1^{st}$ through $n^{th}$ recording layers; and defining a disc management area to store disc management information about the information recording medium on at least one of the $1^{st}$ through $n^{th}$ recording layers. The disc management information includes a disc definition structure for use to manage the data structure of the information recording medium, and $1^{st}$ through $n^{th}$ space bitmaps for use to manage the recording statuses of the $1^{st}$ through $n^{th}$ user data areas. Each of the $1^{st}$ through $n^{th}$ space bitmaps includes bitmap information for use to manage the recording status of its associated one of the $1^{st}$ through $n^{th}$ user data areas on a block-by-block basis. If in a situation where the largest space is allocated to an $i^{th}$ user data area (where i is an integer that falls within the range 1≤i≤n), the number of blocks to use to store the $i^{th}$ space bitmap is $N_i$ (where $N_i$ is an integer that satisfies $N_i≥2$), and if the number of blocks to use to store the $i^{th}$ space bitmap for the $i^{th}$ user data area of an actual size is $M_i$ (where $M_i$ is an integer that satisfies $1≤M_i≤N_i$) and if $M_i$ is equal to or greater than two, then the $i^{th}$ space bitmap is divided into the $1^{st}$ through $M_i^{th}$ space bitmaps, each of which has a size that is still equal to or smaller than one block even when combined with the disc definition structure, and each said space bitmap is stored in an associated one of the $M_i$ blocks in the disc management area.

Advantageous Effects of Invention

According to the present invention, disc management information is read from, or written on, a DMA based on the maximum number of blocks of the disc management information. That is why even if the storage capacity per recording layer increases and the size of an SBM changes, the disc management information can still be read or written without changing the size of the disc management information itself to read or write. That is to say, the read/write operation can be performed with mutual dependence between the DDS and the SBM eliminated.

DESCRIPTION OF EMBODIMENTS

Hereinafter, preferred embodiments of the present invention will be described with reference to the accompanying drawings.

Embodiment 1

Figure 1:
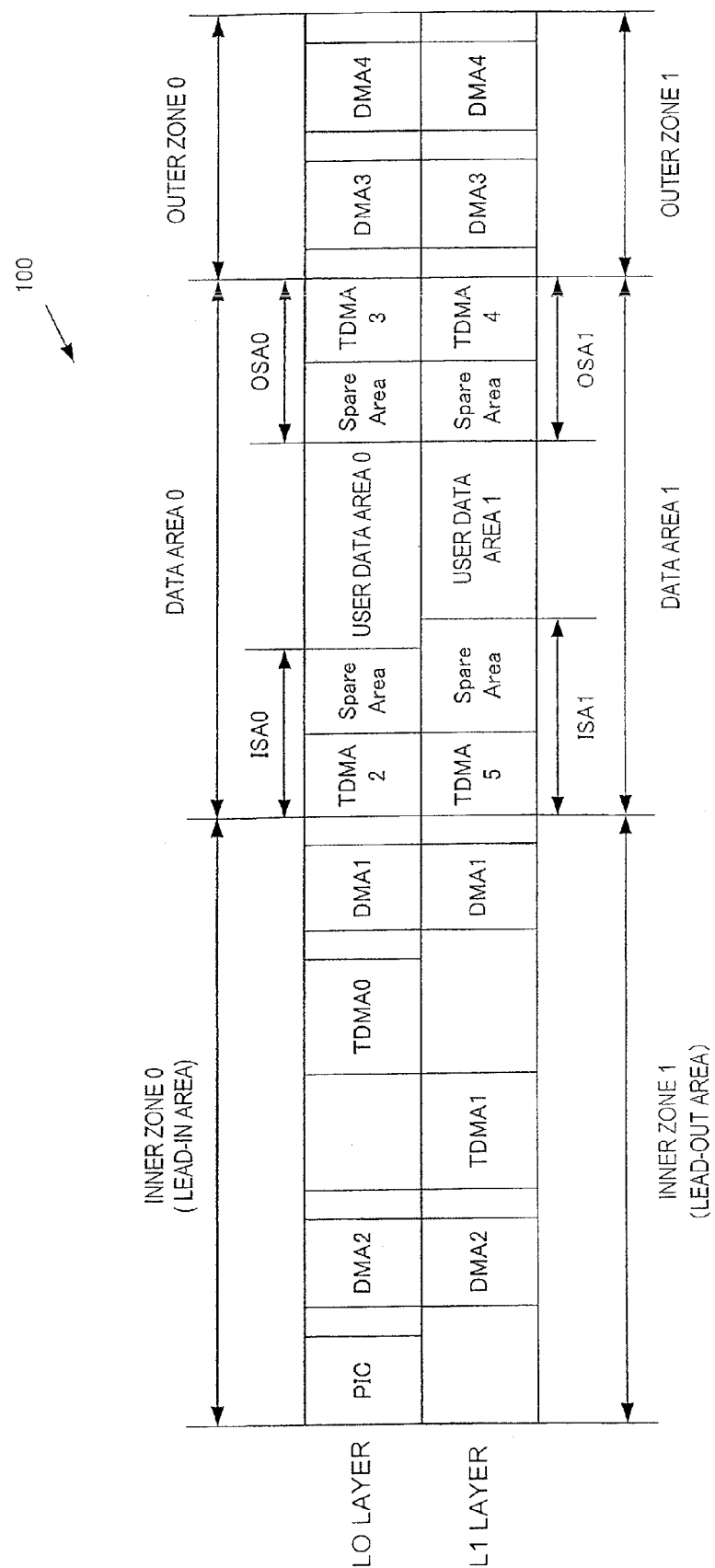
FIG. 1 shows the arrangement of various areas on a write-once information recording medium.

A write-once information recording medium 100 as a first specific preferred embodiment of the present invention also has the same arrangement of areas as what is shown in FIG. 1 and a detailed description thereof will be omitted herein.

FIG. 1 illustrates a recording medium with two recording layers L0 and L1 just as an example. However, the present invention is in no way limited to that specific preferred embodiment. Rather, the information recording medium may have $1^{st}$ through $n^{th}$ recording layers (where n is an integer that is equal to or greater than one). For example, the information recording medium may have n recording layers L0, L1, . . . and Ln-1 (where n is an integer that is equal to or greater than one), which are identified in this order from one of them that is located most distant from the read/write light incident surface.

Each of the $1^{st}$ through $n^{th}$ recording layers has a data area, which includes a user data area to write user data on and a spare area to provide a replacement for any defective part of the user data area. At least one of the $1^{st}$ through $n^{th}$ recording layers has a disc management area (DMA) to store disc management information about the information recording medium.

The disc management information includes a disc definition structure (DDS) for use to manage the data structure of the information recording medium. The disc definition structure may include layout information of the information recording medium (such as information about its format or status). The disc management information further includes $1^{st}$ through $n^{th}$ space bitmaps (SBMs) for use to manage the recording statuses of the $1^{st}$ through $n^{th}$ user data areas. And each of the $1^{st}$ through $n^{th}$ space bitmaps includes bitmap information for use to manage the recording status of its associated one of the $1^{st}$ through $n^{th}$ user data areas on a block-by-block basis. The bitmap information handles one block of the user data area as one bit and may regard a recorded block as one and an unrecorded one as zero, thereby managing the recording status.

Figure 13:
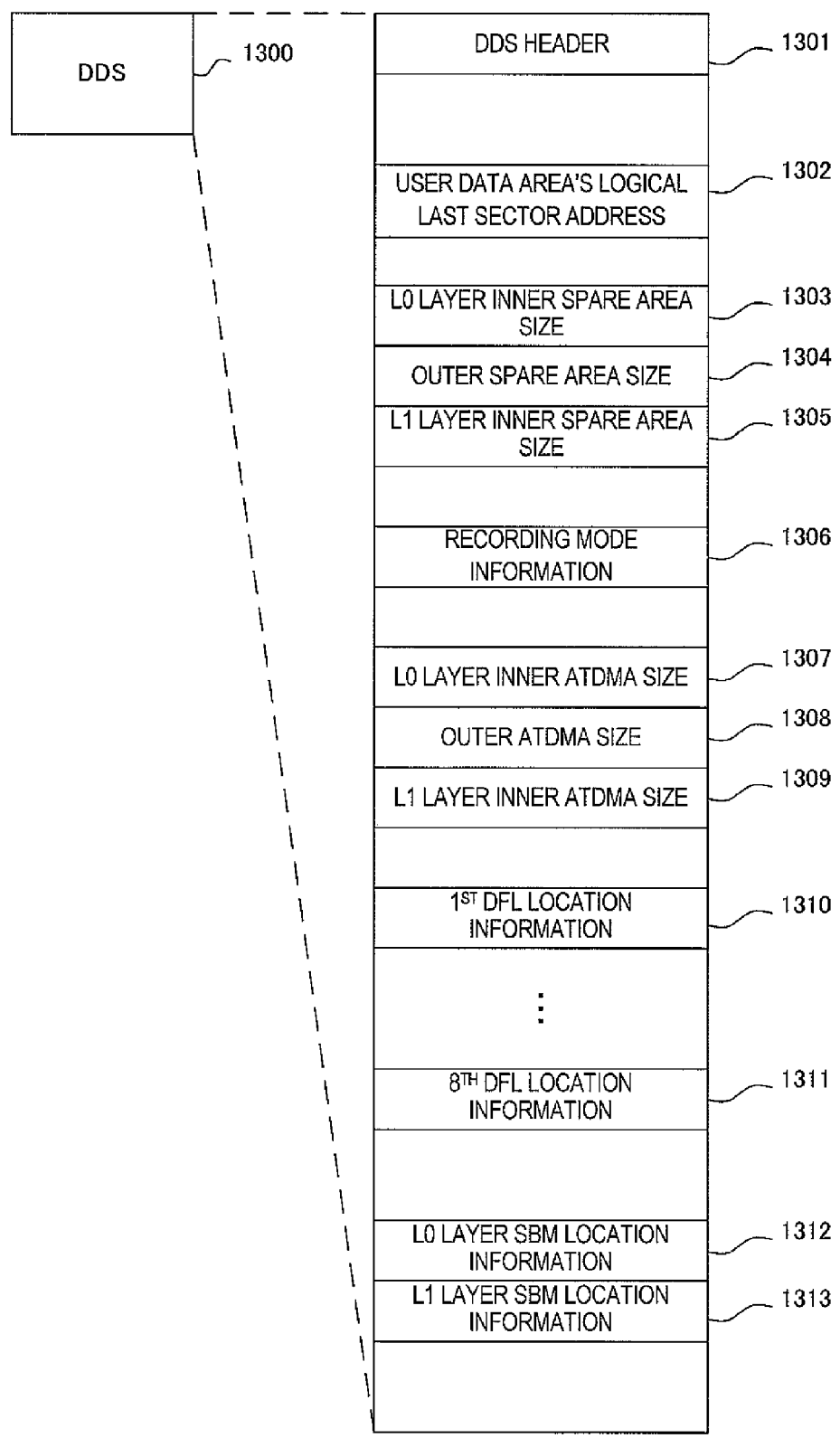
FIG. 13 shows the data structure of the DDS of the conventional dual-layer BD-R.
Figure 14:
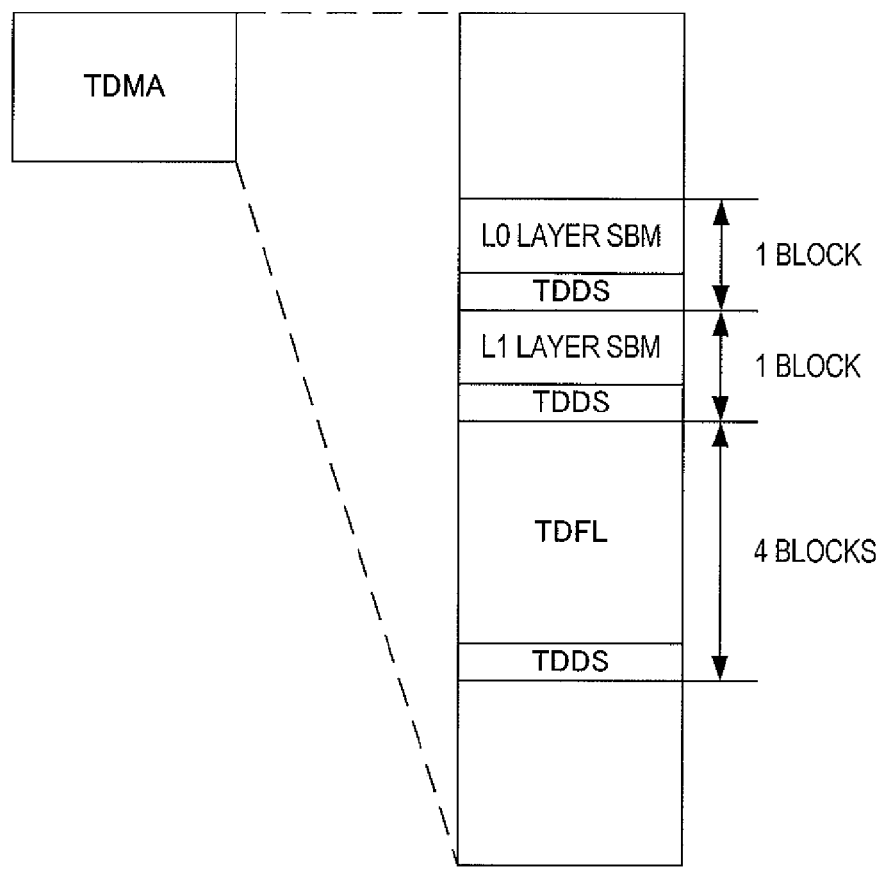
FIG. 14 shows the arrangement of areas in a TDMA on the conventional dual-layer BD-R.

The DDS 400 further includes area information that defines the respective sizes of the user data area and the spare area. When the arrangement shown in FIG. 13 is adopted, for example, the area information includes the spare areas' sizes 1303, 1304 and 1305 and the user data area's logical last sector address 1302, for example.

If the number of blocks allocated to an $i^{th}$ user data area (where i is an integer that falls within the range $1 \leq i \leq n$) is the largest (i.e., if the largest possible space is left for the user data area), the number of blocks to use to store the $i^{th}$ space bitmap is supposed to be $N_i$ (where $N_i$ is an integer that satisfies $N_i \geq 2$).

However, in the following detailed description, the size of the data area is supposed to be defined so that if the widest space is allocated to the user data area, the disc management information has a size of two blocks and that if the narrowest space is allocated to the user data area, the disc management information has a size of one block. That is to say, if the widest space is allocated to the user data area of each layer, the number of blocks $N_i$ to use to store the first space bitmap satisfies $N_1=2$ and the number of blocks $N_2$ to use to store the second space bitmap satisfies $N_2=2$. Conversely, if the narrowest space is allocated to the user data area of each layer, the number of blocks $N_1$ to use to store the first space bitmap satisfies $N_1=1$ and the number of blocks $N_2$ to use to store the second space bitmap satisfies $N_2=1$. In this case, the L0 and L1 layers are supposed to have the same data area size.

In this first preferred embodiment of the present invention, one block consists of 32 sectors, which will be referred to herein as $1^{st}$, $2^{nd}$, . . . and $32^{nd}$ sectors, respectively.

Figure 15:
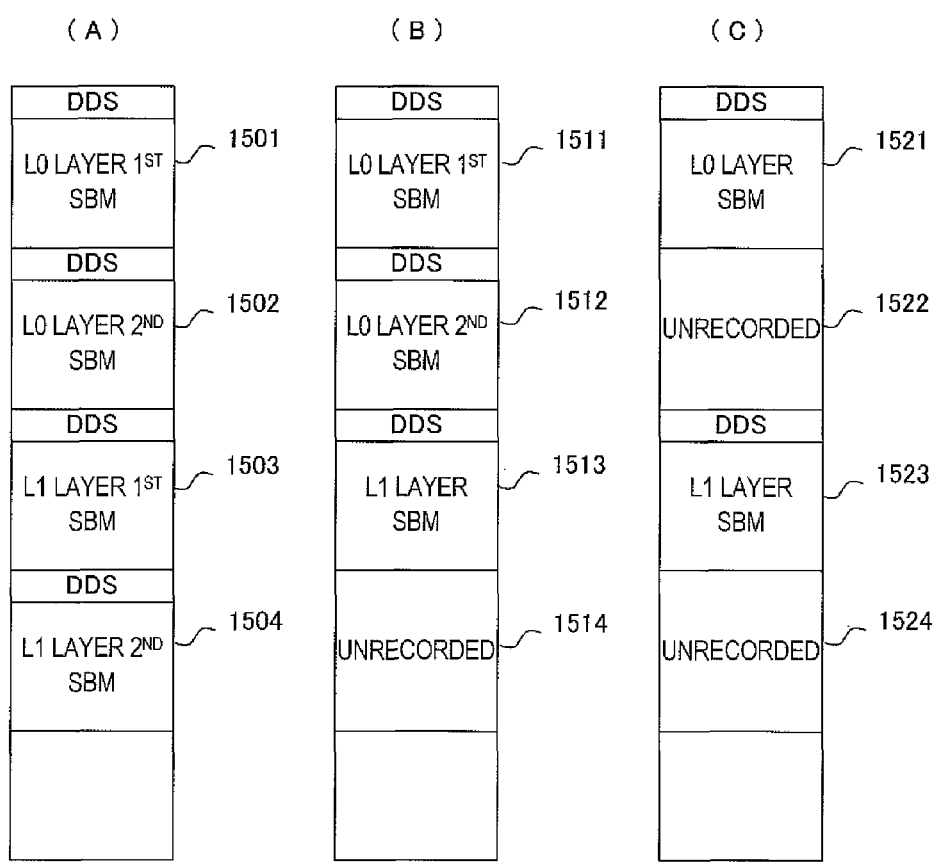
FIGS. 15(A) to 15(C) illustrate exemplary data structures for a DMA of an information recording medium with increased storage capacity according to a preferred embodiment of the present invention.

FIG. 15 illustrates exemplary data structures for the DMA of a write-once information recording medium with increased storage capacity.

Specifically, FIG. 15(A) illustrates a situation where the disc management information has a size of two blocks on each recording layer. FIG. 15(B) illustrates a situation where the disc management information has a size of two blocks on the L0 layer but has a size of one block on the L1 layer. And FIG. 15(C) illustrates a situation where the disc management information has a size of one block on each recording layer.

In each of FIGS. 15(A), 15(B) and 15(C), four blocks, which are the minimum required number of blocks to store the space bitmap of all recording layers, are secured (i.e., $N_1+N_2=4$ is satisfied).

If the SBM provided for the L0 layer cannot be stored in one block but needs to be stored in two blocks as in FIGS. 15(A) and 15(B), then the SBM for the L0 layer may be split into two SBMs (e.g., first and second SBMs for the L0 layer), each of which has a size that is still less than one block even when combined with the DDS, and those two SBMs are written on the two blocks 1501 and 1502, respectively.

That is to say, in the information recording medium of this preferred embodiment, if the number of blocks to use to store the SBM that is provided for one recording layer Li-1 (where i is an integer that is equal to or greater than one) is $M_i$ (which satisfies $1 \leq M_i$) and if $M_i$ is equal to or greater than two, then the SBM is divided into the $1^{st}$ through $M_i^{th}$ SBMs, each of which has a size that is still equal to or smaller than one block even when combined with the DDS and stored in an associated one of the $M_i$ blocks.

Specifically, FIG. 15(A) shows a situation where $M_1=2$ for the recording layer L0 and $M_2=2$ for the recording layer L1.

FIG. 15(B) shows a situation where $M_1=2$ for the recording layer L0 but $M_2=1$ for the recording layer L1. And FIG. 15(C) shows a situation where $M_1=1$ for the recording layer L0 and $M_2=1$ for the recording layer L1.

By securing a required number of blocks to store the space bitmaps of all recording layers, splitting each SBM into a number of blocks that need to be provided to store the SBM for each recording layer and storing the split SBMs on those blocks in this manner, the disc management information can still be stored on the DMA and managed even if the size of the bitmap information varies with that of the user data area (i.e., the size of the spare area) and if the SBM cannot be stored in one block.

Also, as shown in FIG. 15, the DDS has been written at the first sector of each block on which the SBM is stored.

That is to say, in the information recording medium of this preferred embodiment, if the number of blocks to use to store the SBM that is provided for one recording layer Li-1 (where i is an integer that is equal to or greater than one) is $M_i$ (which satisfies $1 \leq M_i$) and if $M_i$ is equal to or greater than two, then the SBM is divided into the $1^{st}$ through $M_i^{th}$ SBMs, each of which has a size that is still equal to or smaller than one block even when combined with the DDS and stored in an associated one of the $M_i$ blocks. And at the first sector of each of those $M_i$ blocks, stored is the DDS.

According to this arrangement, the DDS is stored on not only the first one of the $M_i$ blocks but also the other blocks that follow the first one, too. That is why even if the DDS cannot be retrieved from the first block due to the presence of some defect such as dust or a scratch, the DDS can still be obtained from another block. That is to say, the DDS that is an important piece of information to perform a read/write operation can be written on a much greater number of blocks, and therefore, this information recording medium can be protected more perfectly against some such as dust or a scratch.

As shown in FIGS. 15(A) and 15(B), the first SBM for the recording layer L0 and the second SBM for the recording layer L0 have been written on two consecutive blocks. In the same way, the first and second SBMs for the recording layer L1 have also been written on two consecutive blocks as shown in FIG. 15(A).

That is to say, in the information recording medium of this preferred embodiment, if the number of blocks to use to store the SBM that is provided for one recording layer Li-1 (where i is an integer that is equal to or greater than one) is $M_i$ (which satisfies $1 \leq M_i$), then the $1^{st}$ through $M_i^{th}$ SBMs are stored on a series of $M_i$ blocks.

With such an arrangement, even if an SBM provided for one recording layer needs to be divided into a number of SBMs that should be stored on multiple blocks, those SBMs will be stored on consecutive blocks, and therefore, can be retrieved continuously from those blocks and can be easily obtained at a time.

On top of that, by writing the data on those $M_i$ consecutive blocks, the circumferential locations of those $M_i$ blocks on the information recording medium can be different from each other. Generally speaking, information is written spirally on an information recording medium. That is why if the data were written on discrete blocks, instead of the $M_i$ consecutive blocks, some of those $M_i$ blocks could have substantially the same circumferential locations on the information recording medium depending on the blocks' positions at which the data has been written. This problem is highly likely to arise on the inner area of an information recording medium where the circumference is short. If all of those $M_i$ blocks were positioned at substantially the same circumferential location and if there was any defect such as dust or a scratch at that circumferential location, then almost all of those $M_i$ blocks would turn into defective blocks and no data could be retrieved from them anymore. On the other hand, if the data is written on the $M_i$ consecutive blocks and if the $M_i$ blocks have mutually different circumferential locations on the information recording medium, those $M_i$ blocks would be much less affected by dust, scratches or any other kind of defect.

Figure 3:
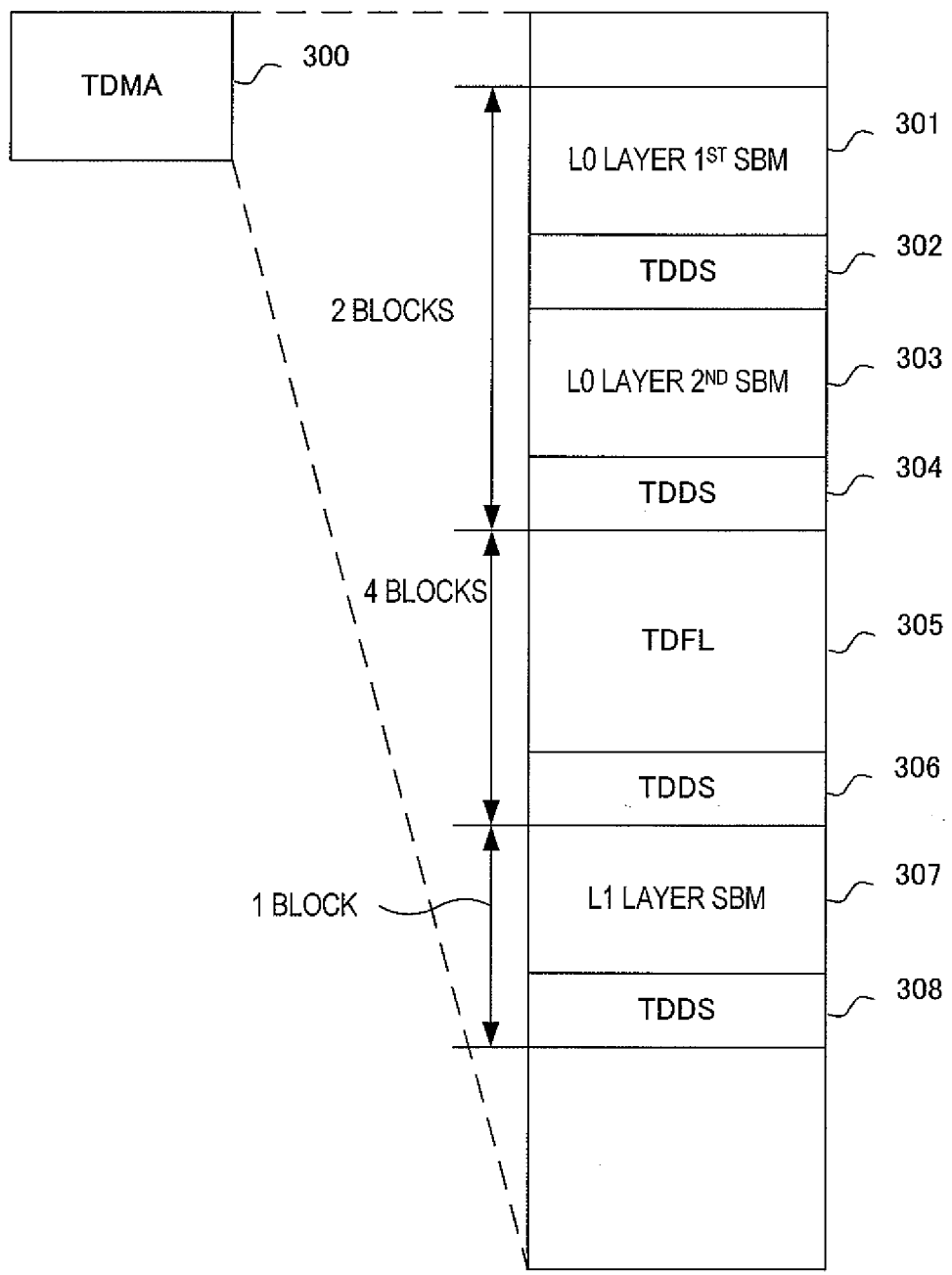
FIG. 3 illustrates an exemplary TDMA data structure for an information recording medium with increased storage capacity.

FIG. 3 illustrates an exemplary TDMA data structure for a write-once information recording medium in which the disc management information is stored on two blocks in its L0 layer and on one block in its L1 layer.

To use the limited area as effectively as possible and to avoid using it up, only minimum required information is written in the TDMA 300. That is to say, the disc management information for the L1 layer is written on just one block.

On the DMA, the disc management information indicating the final status and the defect management information will be copied among various pieces of management information in the TDMA. When data is going to be retrieved from the TDMA and then written on the DMA, the L1 layer's disc management information is stored in only one block and no information is stored on the second block according to the state of the TDMA shown in FIG. 3. In that case, nothing may be written on the second block 1514 or 1524 and the second block may be kept unrecorded as shown in FIGS. 15(B) and 15(C).

As can be seen, in the examples illustrated in FIGS. 15(B) and 15(C), even if there is no SBM to be stored on the second block, unrecorded areas 1514, 1522 and 1524 are left intentionally, instead of storing the disc management information with no spaces left between two adjacent blocks.

That is to say, in the information recording medium of this preferred embodiment, if the largest user data area is allocated to an $i^{th}$ recording layer Li-1 (where $1 \leq i \leq n$) among the $1^{st}$ through $n^{th}$ recording layers L0 through Ln-1 of the information recording medium and if the number of blocks to use to store the SBM is $N_i$ (where $2 \leq N_i$) and if the number of blocks to use to store the actual SBM is $M_i$ (where $1 \leq M_i \leq N_i$) and if $M_i$ is equal to or greater than two, first of all, disc management information including the DDS and the SBM is written on the $M_i$ consecutive blocks. But the ($N_i$-$M_i$) blocks that follow the $M_i$ blocks are left unrecorded. And then the SBM of the $(i+1)^{th}$ recording layer Li starts to be written on the next block. It should be noted that if $M_i = N_i$ as shown in FIG. 15(A), then there will be no unrecorded areas (or blocks) left. It should be noted that the DDS could be written on the first sector of each of the $M_i$ blocks.

With such an arrangement, even if the size of the disc management information varies with that of the user data area (or the sizes of the spare areas), the first one of $M_{i+1}$ blocks of the disc management information for the $(i+1)^{th}$ recording layer will always be written at the same location (or block) in each DMA.

Comparing FIGS. 15(A), 15(B) and 15(C) to each other, it can be seen easily that even if the size of the disc management information for the recording layer L0 is variable (e.g., may be two blocks in FIGS. 15(A) and 15(B) but may be one block in FIG. 15(C)), the first SBM for the Li layer, which is the first block of the disc management information for the recording layer L1, is always written at the same location 1503, 1513, 1523 in the DMA, which is the third block as counted from the top of the area.

As described above, the size of the disc management information depends on the size of the SBM, which in turn depends on the size of the user data area that is determined by that of the spare areas. For that reason, to determine the size of the disc management information, the size of the spare areas, which is defined by the DDS, needs to be obtained.

When the DMA is scanned, however, the DDS has not been retrieved yet, and therefore, the size of the disc management information cannot be determined just yet. Even if the DDS is always written at the first block of a part of the DMA that stores the disc management information, the DDS of that first block could not be obtained due to the presence of some defect such as dust or a scratch.

As can be seen, the DDS and the SEM have mutual dependence. That is to say, unless the DDS can be obtained, the size of the SBM cannot be determined. And unless the size of the SBM can be determined, the DDS cannot be obtained. For that reason, it is not easy to get the disc management information.

Thus, to overcome such a problem, according to this preferred embodiment, as disc management information for the $i^{th}$ recording layer Li-1, disc management information, including the DDS and the SBM, is written on $M_i$ consecutive blocks, first of all. Next, $(N_i-M_i)$ blocks that follow the first $M_i$ blocks are left unrecorded. And then the SBM of the $(i+1)^{th}$ recording layer Li starts to be written from the next block. According to this writing method, the first one of the $M_i$ blocks that store the disc management information is always located at the same position (block) in the DMA, irrespective of the size of the SBM.

As a result, no matter what size the SBM has, at least one block of the disc management information including the DDS (i.e., the first one of the $M_i$ blocks that store the disc management information) can always be located. Consequently, the disc management information including the DDS can be obtained easily, irrespective of the size of the SBM.

Embodiment 2

Next, it will be described how to scan a DMA and obtain management information from it in a situation where a BD-R, on which the information has been written on the DMA as shown in FIG. 15, is inserted and loaded into a drive.

Suppose the drive is attempting to scan all four blocks that store the disc management information at a time to get the disc loading process done in a shorter time. In that case, the drive can scan them at a time in the situation shown in FIG. 15(A) because all of those four blocks are already recorded. However, the drive cannot scan them at a time in the situation shown in FIG. 15(B) or 15(C) because an unrecorded area is included there.

Nevertheless, if the drive attempted to scan those blocks one by one, then even those unrecorded areas not to be scanned would also be scanned anyway and a seek (i.e., a move between areas) should be done every time a scan is started block by block in the situation shown in FIG. 15(B) or 15(C). Consequently, it would take a lot more time to get the disc loading process done in that case.

As can be seen, if the disc management information is stored with some unrecorded areas left, it could take a lot of time to retrieve the disc management information.

Thus, to overcome such a problem, in the information recording medium of this preferred embodiment, if the largest user data area is allocated to an $i^{th}$ recording layer Li-1 (where $1 \le i \le n$) among the $1^{st}$ through $n^{th}$ recording layers L0 through Ln-1 of the information recording medium and if the number of blocks to use to store the SBM is $N_i$ (where $2 \le N_i$) and if the number of blocks to use to store the actual SBM is $M_i$ (where $1 \le M_i \le N_i$) and if $M_i$ is equal to or greater than two, first of all, disc management information including the DDS and the SBM is written on the $M_i$ consecutive blocks. Next, information including the DDS is written on $(N_i-M_i)$ blocks that follow the $M_i$ blocks. It should be noted that the DDS could be written on the first sector of each of the $(N_i-M_i)$ blocks.

With such an arrangement, the disc management information will be written without leaving any unrecorded blocks, and therefore, can be retrieved in a shorter time.

In addition, according to this technique, the DDS is written on each and every block that stores the disc management information. Thus, the DDS that is an important piece of information to perform a read/write operation can be written on a much greater number of blocks, and therefore, this information recording medium can be protected more perfectly against a defect such as dust or a scratch. Furthermore, in a situation where the DDS is always written on the first block of that part of the DMA that stores the disc management information, the DDS could not be retrieved from the first block due to the presence of a defect such as dust or a scratch. Even so, since the DDS is also stored in the second, third and all the other blocks that follow the first block, the DDS can be easily located and obtained.

The DDS carries information of one sector, whereas one block (also called "one cluster") consists of 32 sectors. That is why even if the DDS is written on each of the $(N_i-M_i)$ blocks, the remaining 31 sectors can still be used to store anything else.

Thus, in the information recording medium of this preferred embodiment, data of zeros may be stored in the remaining sectors other than the one on which the DDS has been written.

For example, the DDS may be written on the first sector of one block and data of zeros may be written on the other sectors that follow it. The block 1004 shown in FIG. 10 has such an arrangement.

In the arrangement described above, the DDS and data of zeros are supposed to be written on the $(N_i-M_i)$ blocks. However, the present invention is in no way limited to that specific preferred embodiment. For example, the data of zeros may be replaced with FFh data. Or any other values may be written there except the physical addresses assigned to the disc.

Nevertheless, it is preferred that the DOS and data of zeros be written on those $(N_i-M_i)$ blocks because SBMs should be stored in some of those $(N_i-M_i)$ blocks. This is because if the information written on some of those blocks were recognized to be bitmap information, there should be no user data area to be designated by that bit. However, as bitmap information of zero indicates that its designated area is an unrecorded one and bitmap information of one indicates that its designated area is a recorded one, that user data area should be determined to be an unrecorded one and no information would be retrieved from it.

Alternatively, some meaningful information such as SBMs may be stored in the $(N_i-M_i)$ blocks instead of the invalid data. For example, in FIGS. 15(B) and 15(C), the unrecorded areas 1514, 1522 and 1524 may be replaced with L1 layer SBM, L0 layer SBM and L1 layer SBM, respectively. In that case, the SBMs are stored in multiple different locations, and therefore, the disc can be protected more perfectly against some defect such as dust or a scratch.

Still alternatively, SBM headers may be written on those $(N_i-M_i)$ blocks. Then, the SBM headers can be easily distinguished from the SBMs themselves. In that case, if the size of the bitmap information is set to be zero or if the first physical address of the area managed by the SBM is invalid location information, then it can be determined, during reading, that the SBM stored there is invalid.

Hereinafter, it will be described how to write data on the DMA according to this second preferred embodiment of the present invention so that the data has the DMA data structure shown in FIG. 10.

In the example to be described below, the spare areas are supposed to be allocated so that the disc management information has a size of two blocks on the L0 layer and a size of one block on the L1 layer.

Figure 2:
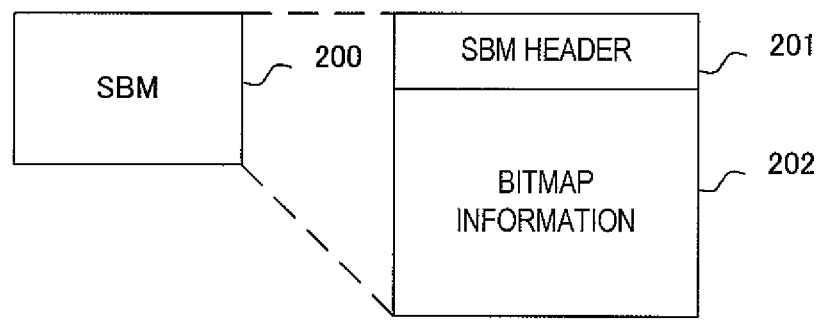
FIG. 2 illustrates the data structure of an SBM.

In this second preferred embodiment of the present invention, the SBMs have the same data structure as what is shown in FIG. 2, and the description thereof will be omitted herein.

FIG. 3 shows the data structure of a TDMA according to the second preferred embodiment of the present invention. On the TDMA 300, only minimum required information is written to use the area as effectively as possible and to avoid using it up. Specifically, the disc management information of the L1 layer is written on only one block.

Figure 4:
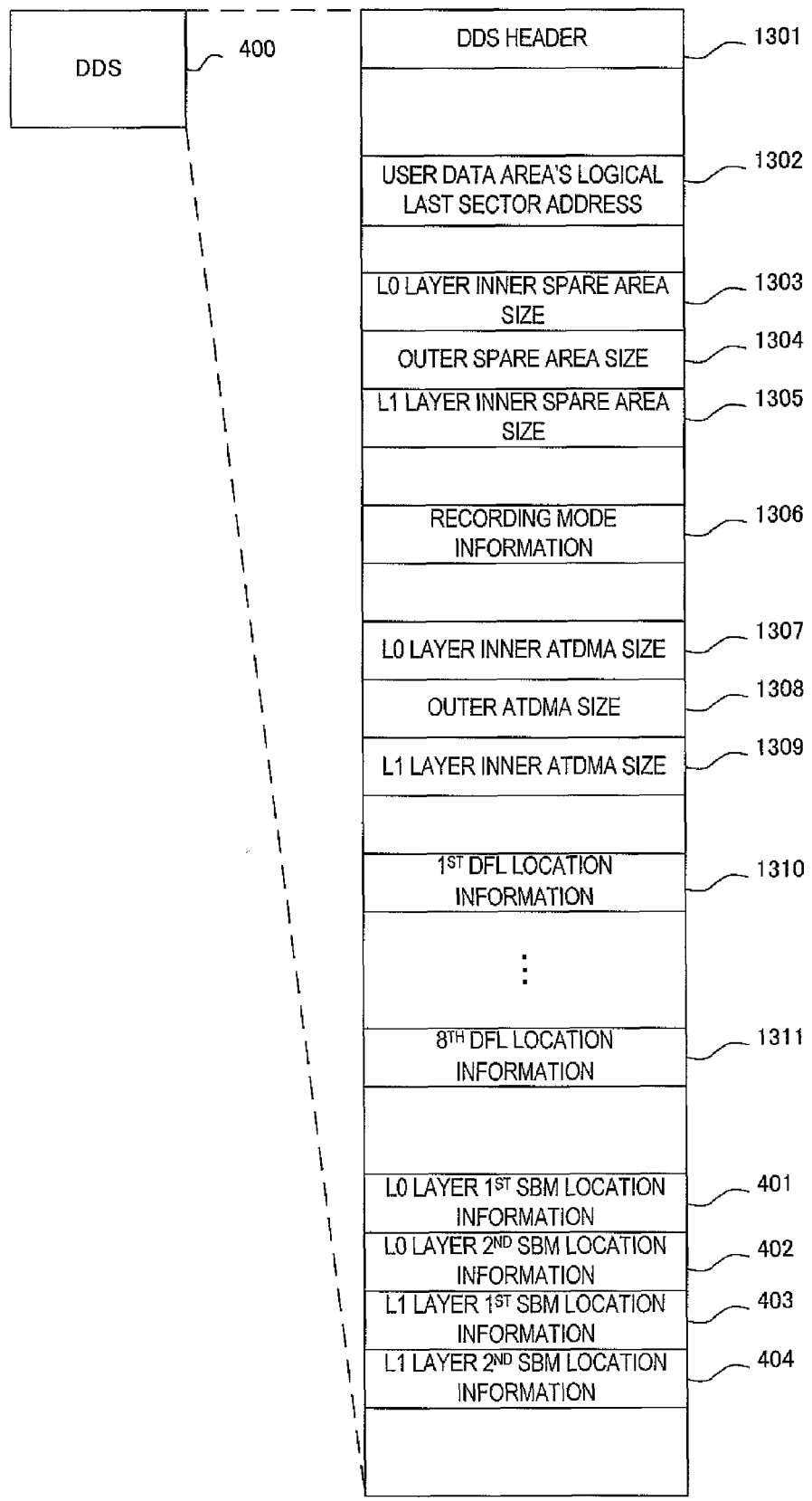
FIG. 4 shows the data structure of a DDS according to a preferred embodiment of the present invention.

FIG. 4 shows the data structure of a DDS according to the second preferred embodiment of the present invention. In FIG. 4, the same element as what is also shown in FIG. 13 is identified by the same reference numeral and the description thereof will be omitted herein.

The DDS 400 according to the second preferred embodiment of the present invention includes SBM location information indicating the locations of respective blocks that store the SBMs. The location information may be the first physical address of a block, for example. According to the second preferred embodiment of the present invention, if the largest space is allocated to the user data area, SBMs will be written on two blocks. That is why the DDS 400 includes four pieces of location information, namely, L0 layer first SBM location information 401, L0 layer second SBM location information 402, L1 layer first SBM location information 403, and L1 layer second SBM location information 404.

According to the size of the spare areas, the SBM may be stored on only one block. In that case, as location information about a block with no SBM, invalid location information indicating that there are no SBMs in the block (e.g., zeros) may be stored.

For example, in the TDMA 300 shown in FIG. 3, if TDDS 308 is the latest TDDS, the L0 layer first SBM location information 401, L0 layer second SBM location information 402, and L1 layer first SBM location information 403 of the TDDS 308 indicate the respective locations of the L0 layer first SBM 301, L0 layer second SBM 303 and L1 layer first SBM 307. On the other hand, since no L1 layer second SBM has been written, zeros are stored as the L1 layer second SBM location information.

The disc management information and defect management information representing the final status are copied from the management information in the TDMA onto the DMA. On the DDS, on the other hand, the latest TDDS is copied (except the DFL location information). Consequently, as each SBM location information of the DDS 400, stored is the same location information as its counterpart in the TDDS 308.

In this example, in a situation where the largest user data area is allocated to each of the $1^{st}$ through $n^{th}$ recording layers L0 through Ln-1, which are multiple recording layers that the information recording medium has, the numbers of blocks to use to store the SBMs on the respective layers are supposed to be $N_1, N_2, \ldots$ and $N_n$, respectively. In that case, the DDS 400 includes $N_1$ pieces of SBM location information, $N_2$ pieces of SBM location information, . . . and $N_n$ pieces of location information as SBM location information for the respective recording layers L0 through Ln-1. Also, in that case, invalid location information will be written on blocks with no SBMs.

As can be seen, if the DDS includes location information about respective blocks with SBMs, it can be determined, just by reference to the DDS, whether valid SBMs are stored or not. If only the location information indicating the storage locations of SBMs on respective recording layers is available as shown in FIG. 13, it is not until the size of the bitmap information of the SBM header is obtained that the size of the valid SBM is known. However, if the DDS includes the location information of respective blocks with SBMs and if the location information of a block with no valid SBM is zero, the validity of SBMs can be determined, without depending on the SBMs, just by reading the DDS and deciding whether the SBM location information is zero or not.

Figure 5:
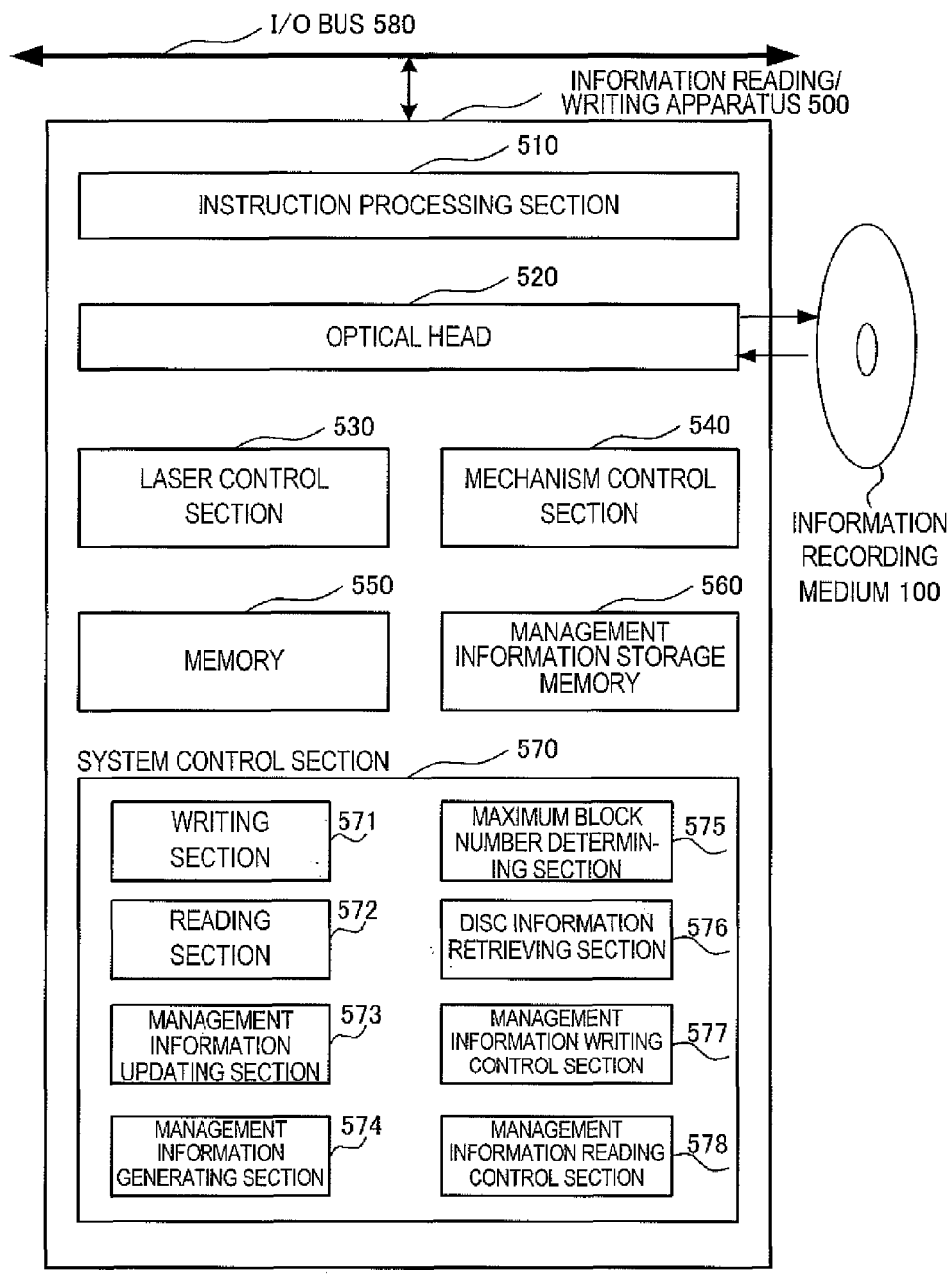
FIG. 5 illustrates an information reading/writing apparatus as a preferred embodiment of the present invention.

FIG. 5 illustrates a configuration for an information reading/writing apparatus 500 according to this second preferred embodiment of the present invention.

The information reading/writing apparatus 500 is connected to a high-order controller (not shown) through an I/O bus 580. The high-order controller may be a host computer (host PC), for example.

The information reading/writing apparatus 500 includes: an instruction processing section 510 for processing instructions given by the high-order controller; an optical head 520 that irradiates the information recording medium 100 with a laser beam to perform a read/write operation on it; a laser control section 530 for controlling the power of the laser beam that has been emitted from the optical head 520; a mechanism control section 540 for moving the optical head 520 to a target location and performing a servo control operation; a memory 550 for storing the user data that has been read or written and various other kinds of information; a management information storage memory 560 for storing various management information such as SBM, DDS, or DFL that have been read from, or written on, the TDMA and DMA; and a system control section 570 for controlling the overall system processing including read/write processing on the information recording medium 100.

The system control section 570 includes: a writing section 571, which sets writing conditions such as a laser power for recording for the laser control section 530, gets the optical head 520 moved by the mechanism control section 540 to a specified area, and makes the optical head 520 emit light, thereby writing information from a predetermined memory location onto the specified area; a reading section 572, which sets reading conditions such as the laser power for scanning for the laser control section 530, gets the optical head 520 moved by the mechanism control section 540 to a specified area, and makes the optical head 520 emit light, thereby reading information from the specified area and storing it at a predetermined memory location; a management information updating section 573 for updating the management information that is stored in the management information storage memory 560; a management information generating section 574 for generating management information to be written on the DMA based on the management information that is stored in the management information storage memory 560; a maximum block number determining section 575 for determining the maximum number of blocks to use to store the disc management information; a disc information retrieving section 576 for retrieving disc information from a control information area; a management information writing control section 577 for controlling respective sections of the system control section in order to write management information on the DMA; and a management information reading control section 578 for controlling the respective sections of the system control section in order to read management information from the DMA or TDMA.

Figure 6:
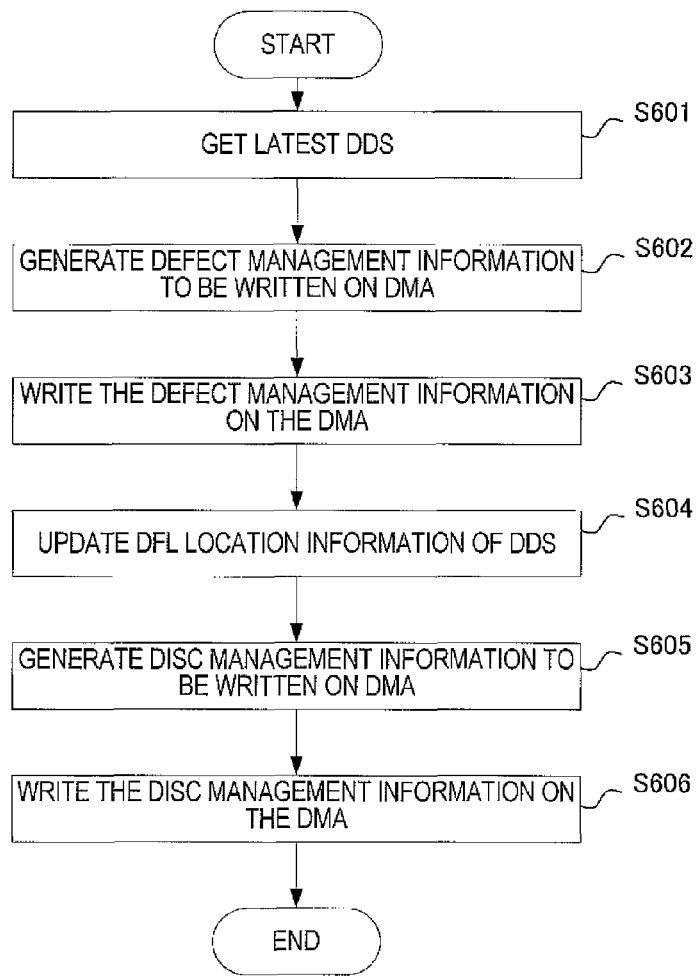
FIG. 6 is a flowchart showing how to perform a write operation on a DMA according to a preferred embodiment of the present invention.

FIG. 6 is a flowchart showing the procedure of writing disc management information, defect management information and other kinds of information on a DMA according to the second preferred embodiment of the present invention.

First of all, in Step 601, the management information reading control section 578 instructs the reading section 572 to get the latest DDS from the TDMA and store it in the management information storage memory 560. Since a write operation on the DMA is supposed to be carried out during finalizing (or disc closing), the latest management information at this point in time indicates the final status of the information recording medium.

Next, in Step 602, the management information reading section 578 retrieves first through eighth pieces of DFL location information from the latest DDS that has been gotten in the previous processing step 601, and instructs the reading section 572 to store the latest DFL, which is included in the location information retrieved, in the management information storage memory 560. Subsequently, the management information generating section 574 secures eight blocks for generating and storing defect management information to be written on the DMA within the management information storage memory 560. Then, the management information generating section 574 initializes all of those blocks secured into zero and stores the latest DFL in respective locations in the memory 560 that are provided for those blocks.

Next, in Step 603, the management information writing control section 577 instructs the writing section 571 to write seven out of the eight blocks of defect management information, which have been generated in the previous processing step 602, on a series of blocks that begins with the ninth block as counted from the top of the DMA.

Thereafter, in Step 604, the management information updating section 573 updates the first through eighth pieces of DFL location information, which have been retrieved in Step 601, into pieces of information indicating the respective locations of blocks of the defect management information that has been properly written on the DMA in the previous processing step 603.

Subsequently, in Step 605, the disc management information to be written on the DMA is generated. This processing step will be described in detail later.

Finally, in Step 606, the disc management information that has been generated in the previous processing step 605 is written on a predetermined area in the DMA. This processing step will be described in detail later, too.

Figure 7:
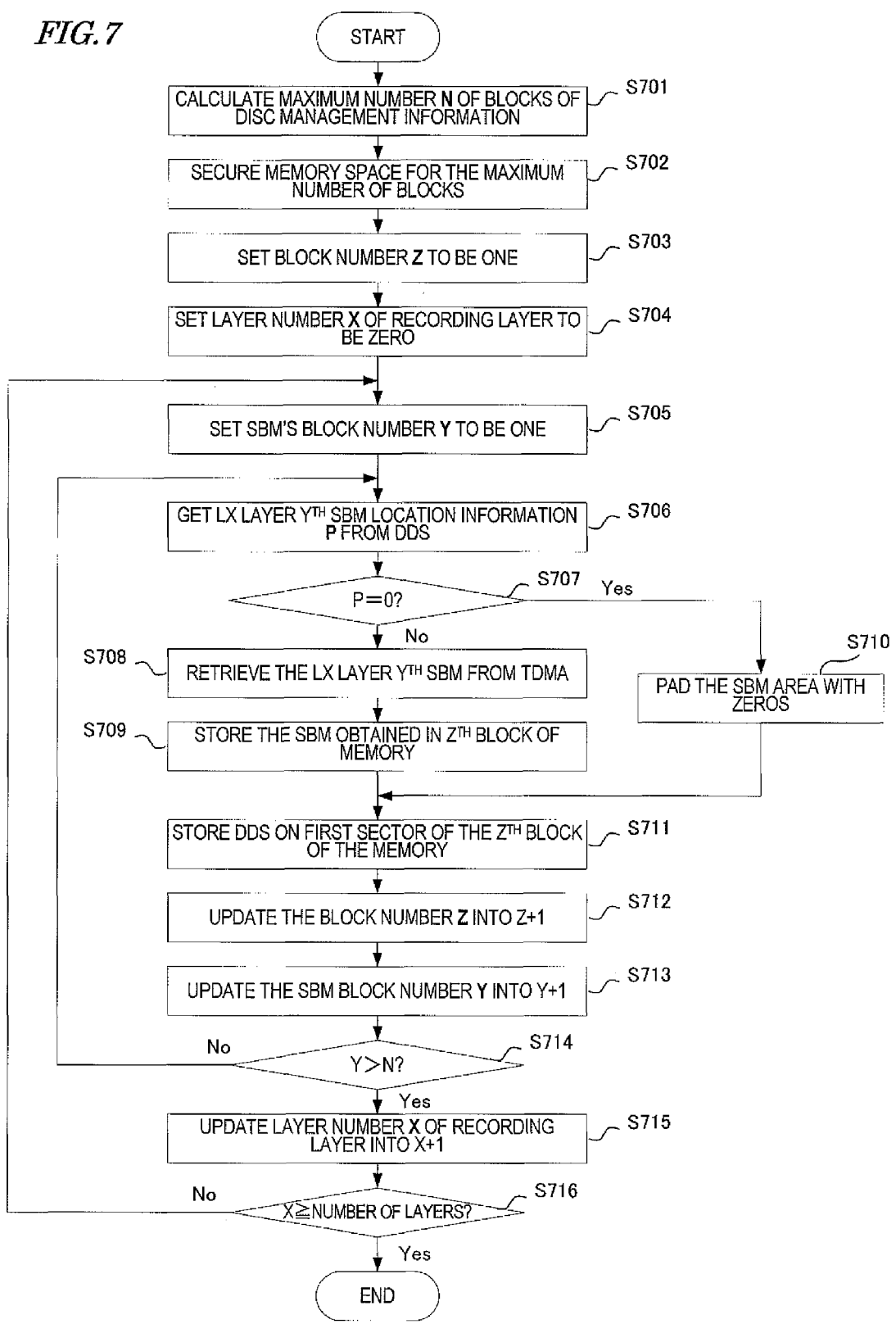
FIG. 7 is a flowchart showing the procedure of generating disc management information according to a preferred embodiment of the present invention.

FIG. 7 is a flowchart showing the procedure of generating the disc management information to be written on the DMA according to this second preferred embodiment of the present invention.

First of all, in Step 701, the maximum number N of blocks of the disc management information is calculated. Specifically, for that purpose, the disc information retrieving section 576 instructs the reading section 572 to retrieve disc information from the control information area and store it in the memory 550. Next, the maximum block number determining section 575 gets the first and last physical addresses TPSN and EPSN of the data area of each recording layer from the disc information that is stored in the memory 550. Then, the difference between the first and last physical addresses TPSN and EPSN of the data area of each recording layer is divided by the number of blocks per address, thereby obtaining the maximum number of blocks of the disc management information of each recording layer. That is to say, the maximum number of blocks MAXBLK of the disc management information of each recording layer is calculated by (EPSN−TPSN)/(number of blocks per address). For example, supposing each physical address represents one sector, the number of blocks per address will be 32. In this preferred embodiment of the present invention, if the maximum number of blocks of the disc management information of the L0 layer and that of the disc management information of the L1 layer are identified by N1 and N2, respectively, then N1 and N2 are both two, and therefore, the maximum number N of blocks of the disc management information is four, which is the sum of N1 and N2.

Next, in Step 702, the management information generating section 574 secures four blocks in the management information storage memory 560 because the number of blocks to use to generate the disc management information to be written on the DMA is the maximum number N of blocks.

Subsequently, in Step 703, the management information generating section 574 sets the block number Z of that area secured in the management information storage memory 560 to be one.

Thereafter, in Step 704, the management information generating section 574 sets the layer number X of the recording layer to be zero.

Then, in Step 705, the management information generating section 574 sets the block number Y of the SBM to be one.

Next, in Step 706, the management information generating section 574 gets Lx layer $Y^{th}$ SBM location information P (i.e., the location information of the $Y^{th}$ SBM on the Lx layer) from the DDS that has been gotten in the processing step 601.

Subsequently, in Step 707, the management information generating section 574 determines whether the Lx layer $Y^{th}$ SEM location information P that has been gotten in the previous processing step 706 is zero or not. If the answer to the query of this processing step 707 is NO (i.e., unless P is zero and if any SBM has been written), the process advances to Step 708 to read that SBM. On the other hand, if the answer to the query of this processing step 707 is YES (i.e., if no SBM has been written), then the process advances to Step 710.

Thereafter, in Step 708, the management information reading control section 578 instructs the reading section 572 to retrieve the Lx layer $Y^{th}$ SBM from the location P in the TDMA that has been gotten in the processing step 706 and store it in the management information storage memory 560.

Then, in Step 709, the management information generating section 574 stores the Lx layer $Y^{th}$ SBM that has been retrieved in the previous processing step 708 in the $2^{nd}$ through $32^{nd}$ sectors of the $Z^{th}$ block that has been secured in the memory in the processing step 702.

Meanwhile, in Step 710, the management information generating section 574 stores data of all zeros in the $2^{nd}$ through $32^{nd}$ sectors of the $Z^{th}$ block that has been secured in the memory in the processing step 702.

Next, in Step 711, the management information generating section 574 stores the DDS, of which the DFL location information has been updated in the processing step 604, on the first sector of the $Z^{th}$ block that has been secured in the memory in the processing step 702.

Thereafter, in Step 712, the management information generating section 574 updates the block number Z of the area that has been secured in the management information storage memory 560 into Z+1.

Then, in Step 713, the management information generating section 574 updates the block number Y of the SBM into Y+1.

Subsequently, in Step 714, the management information generating section 574 determines whether or not the block number Y of the SBM is greater than the maximum number NY of blocks of the disc management information of each recording layer. If the answer to the query of this processing step 714 is YES (i.e., if there is no disc management information to generate for the Lx layer), the process advances to Step 715. Otherwise (i.e., if there is disc management information to generate for the Lx layer and if the answer to the query of this processing step 714 is NO), the process goes back to the processing step 706 to generate that disc management information. In this preferred embodiment of the present invention, the maximum number of blocks of the disc management information of each recording layer to be compared to the block number Y of the SBM is $N_0=2$ for the L0 layer and $N_1=2$ for the L1 layer.

Subsequently, in Step 715, the management information generating section 574 updates the layer number X of the recording layer into X+1.

Finally, in Step 716, the management information generating section 574 determines the number of recording layers by reference to the disc information and decides whether or not the layer number X of the current recording layer is equal to or greater than the number of recording layers. If the answer to the query of this processing step 716 is NO (i.e., if X is less than the number of recording layers), the process advances to Step 705 to generate disc management information for another recording layer. On the other hand, if the answer to the query of this processing step 716 is YES (i.e., if X is equal to or greater than the number of recording layers), then the process ends because the disc management information has already been generated for every recording layer.

Figure 8:
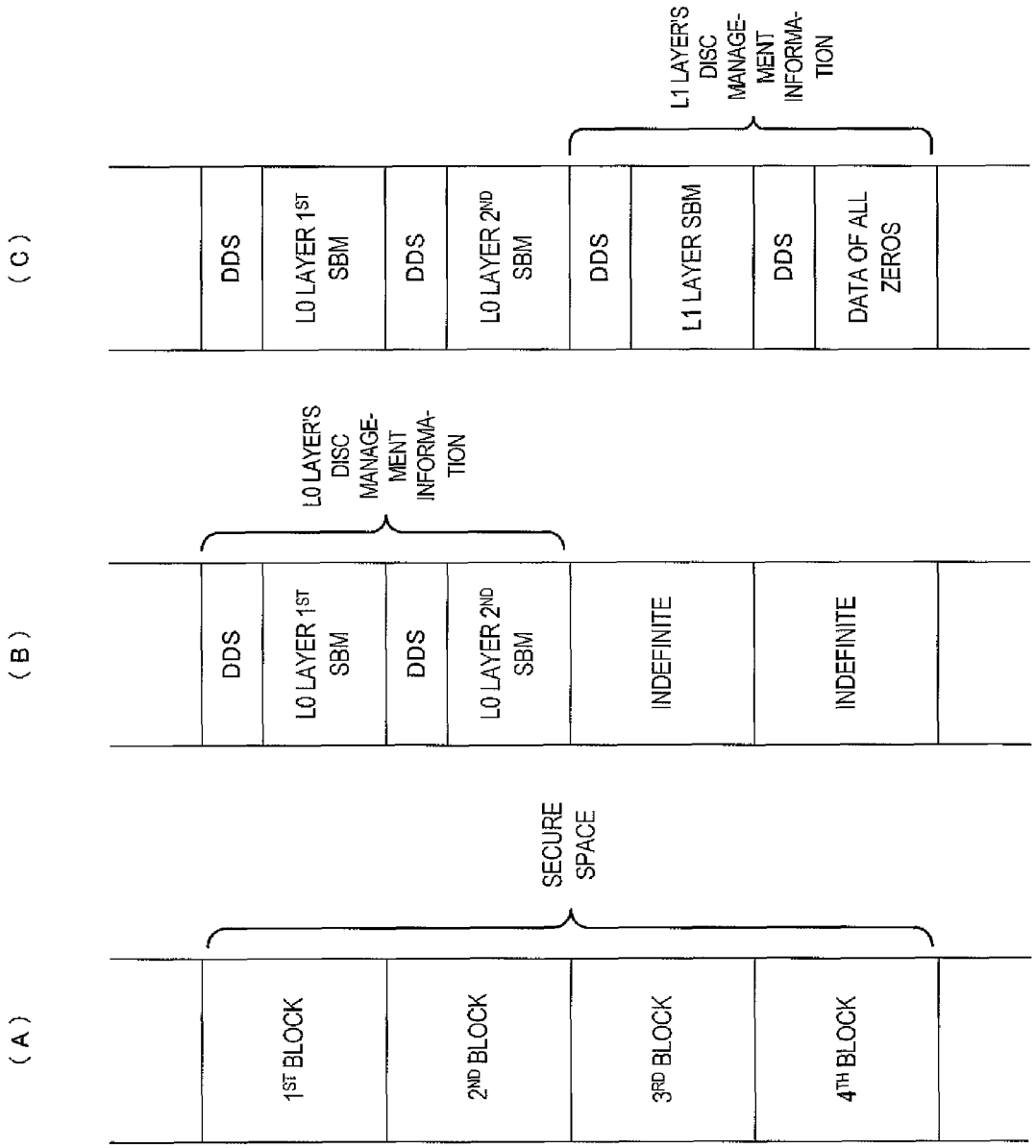
FIGS. 8(A) to 8(C) show how a memory changes its statuses when disc management information is generated in a preferred embodiment of the present invention.

FIG. 8 illustrates exemplary states of the management information storage memory while the disc management information to be written on the DMA is being generated according to the second preferred embodiment of the present invention. Specifically, FIG. 8(A) shows how a memory area has been secured in the processing step 702. FIG. 8(B) shows how disc management information, including L0 layer SBMs, has been generated. And FIG. 8(C) shows how disc management information, including L1 layer SBM, has been generated.

In this preferred embodiment, the maximum block number of the disc management information is four, and therefore, a memory area that covers four blocks is secured in the management information storage memory in the processing step 702.

If the same series of processing steps that begins with the processing step 705 are repeatedly carried out with the layer number X initially set to be zero until the answer to the query of the processing step 713 becomes YES, then the disc management information of the L0 layer will be stored so that the L0 layer first SBM 301 and the L0 layer second SBM 303, which have been written on the TDMA, are stored in the first and second blocks, respectively, and the DDS will be stored at the top of the first and second blocks.

If the layer number X is changed into one, then the L1 layer SBM 307 that has been written on the TDMA will be stored on the third block in the processing steps 708 and 709. However, there is no second block for the L1 layer. For that reason, P is determined to be zero and data of all zeros will be stored in Step 707. Consequently, as shown in FIG. 8(C), the DDS will be stored at the top of the fourth block and data of all zeros will be stored in its SBM area.

As described above, according to the method of generating disc management information of the second preferred embodiment of the present invention, if there is any SBM to store, disc management information including a DDS and the SBM will be generated. On the other hand, if there are no SBMs to store (i.e., if the disc management information is short of the maximum number of blocks), then disc management information that does include a DDS but does not include any SBM is generated. That is to say, disc management information, including both a DDS and an SBM, is generated for three blocks and disc management information, including a DDS but no SBMs, is generated for one block.

In the method of generating disc management information according to this preferred embodiment of the present invention, if there are no SBMs to store, data of zeros is supposed to be stored instead. However, the present invention is in no way limited to that specific preferred embodiment. For example, the data of zeros may be replaced with FFh data. Nevertheless, it is still preferred that the rest of the block that stores such disc management information including a DDS but no SBMs be zeros because that remaining area corresponds to an SBM storage area. This is because if the information written on such a block were recognized to be bitmap information, there should be no user data area to be designated by that bit. However, as bitmap information of zero indicates that its designated area is an unrecorded one and bitmap information of one indicates that its designated area is a recorded one, the user data area should be determined to be an unrecorded one and no information would be retrieved from it.

Alternatively, the same SBM may be generated and stored in that reaming area instead of the invalid data. That is to say, if P is determined to be zero in Step 707, then the L1 layer SBM 307 could be stored twice and the disc management information including the DDS and the L1 layer SBM 307 could be generated as the L1 layer disc management information for two blocks. In that case, since the same SBM is stored at multiple different locations, the disc can be protected more perfectly against some defect such as dust or a scratch.

Still alternatively, SBM headers may be generated so as to be easily distinguishable from the SBMs. In that case, if the size of the bitmap information is set to be zero or if the first physical address of the area managed by the SBM is invalid location information, then it can be determined that the SBM stored there is invalid.

Also, in the preferred embodiment described above, data of all zeros is supposed to be stored in the processing step 710. However, such data of zeros may also be stored by securing the storage area in Step 702 and then initializing that secured area into zeros.

Furthermore, in the preferred embodiment described above, the latest DDS, DFL and SBM are supposed to be retrieved from the TDMA in the processing steps 601, 602 and 708. However, if the latest DDS, DFL and SBM are already stored in the management information storage memory, there is no need to retrieve them, but those pieces of information stored in the management information storage memory may be naturally used.

Furthermore, in the preferred embodiment described above, the maximum number of blocks of the disc management information is supposed to be determined in the processing step 701 by the first and last physical addresses of the data area that are included in the disc information. However, any other kind of information can also be used as long as it can contribute to detecting the size (i.e., the capacity) of the data area. For example, the maximum number of blocks can also be determined by the channel bit length because the channel bit length varies with the capacity of the data area. Alternatively, the maximum number of blocks could also be determined by the nominal writing speed, which also varies with the capacity of the data area. Still alternatively, the maximum number of blocks can also be determined by the logical last sector address of the user data area and the size of the spare areas because the logical last sector address of the user data area is included in the DDS. Furthermore, if the size of the data area is determined unequivocally by the number of recording layers, then data area size options for respective numbers of layers may be stored and the size of the data area may be determined by the actual number of recording layers.

Furthermore, in the processing step 701, the maximum sizes N1 and N2 of the disc management information of the respective recording layers are determined. However, if the respective data areas of those recording layers have the same size, then the maximum size of the disc management information of only one of those two recording layers may be obtained and then simply multiplied by the number of the recording layers.

Furthermore, in the preferred embodiments of the present invention described above, the location information of each block that stores the SBM is included in the DDS, and therefore, it can be determined only by reference to the DDS whether a valid SBM is stored there or not. If only the location information indicating the storage locations of SBMs on respective recording layers is available as shown in FIG. 13, it is not until the size of the bitmap information of the SBM header is obtained that the size of the valid SBM is known. However, if the DDS includes the location information of respective blocks with SBMs and if the location information of a block with no valid SBM is zero, the validity of SBMs can be determined, without depending on the SBMs, just by reading the DDS and deciding whether the SBM location information is zero or not.

In the preferred embodiment described above, the location information of a block with no SBM is supposed to be zeros. However, the present invention is in no way limited to that specific preferred embodiment and any other kind of invalid location information may be stored there instead. For example, the data of zeros may be replaced with FFh data. Or any other values may be written there except the physical addresses assigned to the disc.

Figure 9:
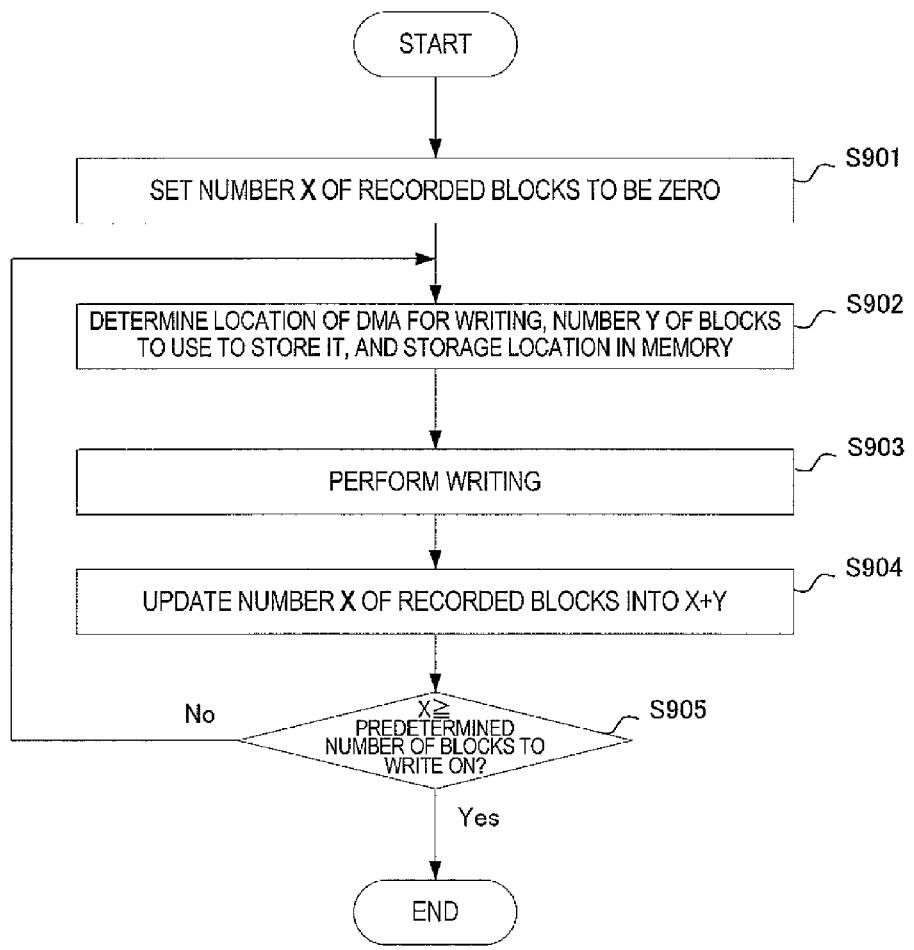
FIG. 9 is a flowchart showing the procedure of writing disc management information on a DMA according to a preferred embodiment of the present invention.

FIG. 9 is a flowchart showing the procedure of writing the disc management information thus generated on the DMA according to this second preferred embodiment of the present invention.

First of all, in Step 901, the management information writing control section 577 sets the number X of recorded blocks to be zero.

Next, in Step 902, the management information writing control section 577 determines the location information of the DMA that is the target of the write operation, the number Y of blocks to write the information on, and information about the memory location at which the disc management information to write is stored.

Subsequently, in Step 903, the management information writing control section 577 instructs the writing section 571 to write data of Y blocks on the specified location in the DMA by reference to the memory location information that has been obtained in the previous processing step 902.

Then, in Step 904, the management information writing control section 577 updates the number of recorded blocks X into X+Y.

Finally, in Step 905, the management information writing control section 577 determines whether or not the number X of recorded block is equal to or greater than the total number of blocks to write to. If the answer to the query of this processing step 905 is NO (i.e., if X is short of the total number of blocks to write to), then the process advances to Step 902 to write disc management information on the next block. On the other hand, if the answer to the query of this processing step 905 is YES (i.e., if the X is equal to or greater than the total number of blocks to write to), then every piece of disc management information has already been written there and the processing ends.

Figure 10:
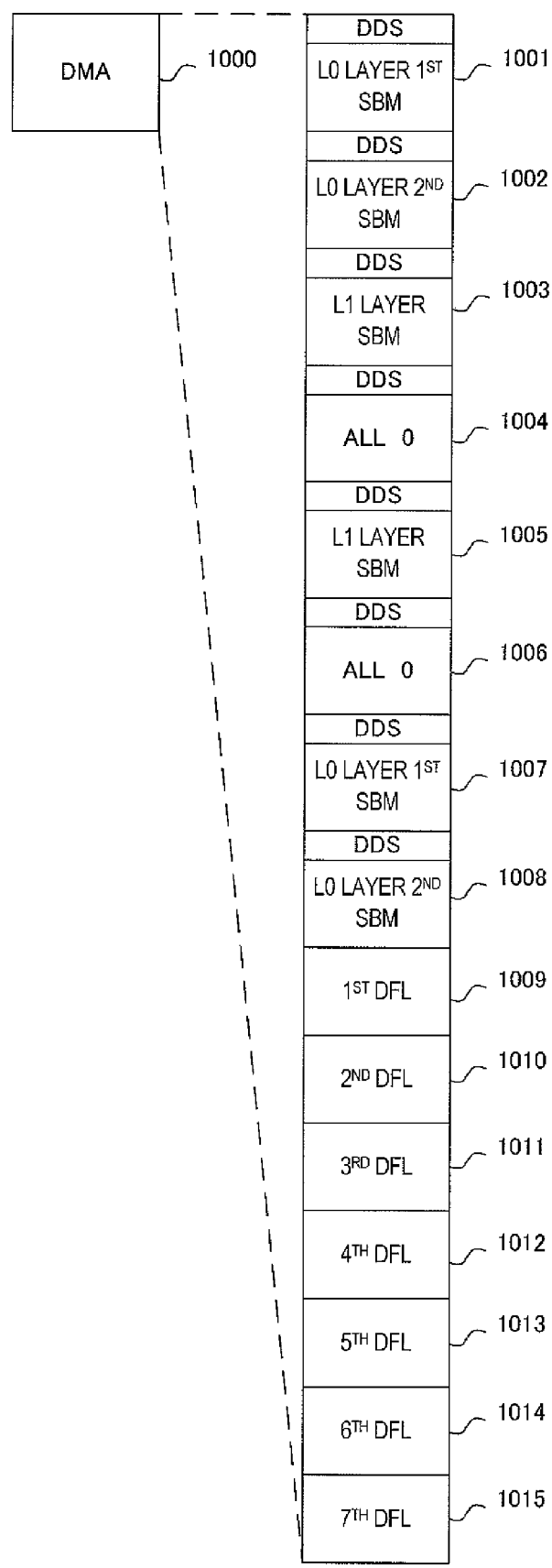
FIG. 10 shows the data structure of a DMA on which a write operation has been performed by a method according to a preferred embodiment of the present invention.

FIG. 10 shows the data structure of a DMA on which a write operation has been performed by the DMA writing method of this second preferred embodiment of the present invention.

In this case, on the DMA 1000, the same set of L0 and L1 layer SBMs is supposed to be written twice as shown in FIG. 15(B) but the L1 layer SBM is supposed to be written earlier than the L0 layer SBMs for the second time around. That is why the total number of blocks to write to becomes eight in the processing step 905.

The disc management information of the L0 and L1 layers is stored on four consecutive blocks as shown in FIG. 8(C). That is why the write operation is performed with the DMA location information set to be the first block 1001 of the DMA, the number of blocks to write to set to be four, and the memory location information set to be the first block shown in FIG. 8(A).

Next, to write the L1 layer's disc management information, the write operation is performed with the DMA location information set to be the fifth block 1005 of the DMA, the number of blocks to write on set to be two, and the memory location information set to be the third block shown in FIG. 8(A). That is to say, the information stored in the third block shown in FIG. 8(A) is written on the fifth block 1005 of the DMA.

Thereafter, to write the L0 layer's disc management information, the write operation is performed with the DMA location information set to be the seventh block 1007 of the DMA, the number of blocks to write on set to be two, and the memory location information set to be the first block shown in FIG. 8(A). As a result, the DMA comes to have the data structure shown in FIG. 10.

As described above, according to the DMA writing method of this second preferred embodiment of the present invention, the maximum number of blocks of the disc management information is obtained, and disc management information is generated for that maximum number of blocks and then written on the DMA. That is why even if the size of SBMs varies, the size of the disc management information to write does not change. Consequently, the disc management information can be written without depending on the size of the SBMs. That is to say, the write operation can be performed with the arrangement of areas in the DMA fixed and with the mutual dependence between DDS and SBM eliminated.

In addition, blocks with a DDS and an SBM and blocks with a DDS but without an SBM are written on the DMA and the DDS will always be written at the first sector of each block. As a result, the DDS that is an important piece of information to perform a read/write operation can be written on a much greater number of blocks, and therefore, this information recording medium can be protected more perfectly against a defect such as dust or a scratch.

On top of that, as there are no unrecorded areas in the range in which the disc management information is going to be written, the information can be written there continuously, and therefore, no time needs to be spent to get a seek operation done. As a result, the finalize operation can get done in a shorter time.

Hereinafter, the information writing method and the configuration and operation of the information writing apparatus according to this preferred embodiment will be described in further detail.

If an SBM for the recording layer L0 cannot be stored in one block but needs to be stored in two blocks as shown in FIGS. 15(A) and 15(B), the SBM for the recording layer L0 is split into two SBMs, each of which has a size that is still less than one block even when combined with the DOS, and those two SBMs are written on two blocks 1501 and 1502, respectively. In the example shown in FIG. 10, L0 layer first and second SBMs are written on blocks 1001 and 1002, respectively.

That is to say, in the information writing method and apparatus of this preferred embodiment, if the number of blocks to use to store the SBM that is provided for one recording layer Li-1 (where i is an integer that is equal to or greater than one) is. $M_i$ (which satisfies $1 \leq M_i$) and if $M_i$ is equal to or greater than two, then the SBM is divided into the $1^{st}$ through $M_i^{th}$ SBMs, each of which has a size that is still equal to or smaller than one block even when combined with the DDS and stored in an associated one of the $M_i$ blocks.

Specifically, FIG. 15(A) shows a situation where $M_1=2$ for the recording layer L0 and $M_2=2$ for the recording layer L1. FIGS. 15(B) and 10 show a situation where $M_1=2$ for the recording layer L0 but $M_2=1$ for the recording layer L1.

By performing a write operation in this manner, the disc management information can still be stored on the DMA and managed even if the size of the bitmap information varies with that of the user data area (i.e., the size of the spare area) and if the SBM cannot be stored in one block.

Also, as shown in FIGS. 15 and 10, the DDS has been written at the first sector of each block on which the SBM is stored.

That is to say, according to the information writing method and apparatus of this preferred embodiment, if the number of blocks to use to store the SBM that is provided for one recording layer Li-1 (where i is an integer that is equal to or greater than one) is $M_i$ (which satisfies $1 \leq M_i$) and if $M_i$ is equal to or greater than two, then the SBM is divided into the $1^{st}$ through $M_i^{th}$ SBMs, each of which has a size that is still equal to or smaller than one block even when combined with the DDS and stored in an associated one of the $M_i$ blocks. And at the first sector of each of those $M_i$ blocks, stored is the DDS.

According to this arrangement, the DDS is stored on not only the first one of the $M_i$ blocks but also the other blocks that follow the first one, too. That is why even if the DDS cannot be retrieved from the first block due to the presence of some defect such as dust or a scratch, the DDS can still be obtained from another block. That is to say, the DDS that is an important piece of information to perform a read/write operation can be written on a much greater number of blocks, and therefore, this information recording medium can be protected more perfectly against some defect such as dust or a scratch.

As shown in FIGS. 15(A) and 15(B) and FIG. 10, the first SEM for the recording layer L0 and the second SBM for the recording layer L0 have been written on two consecutive blocks. In the same way, the first and second SBMs for the recording layer L1 have also been written on two consecutive blocks as shown in FIG. 15(A).

That is to say, according to the information writing method and apparatus of this preferred embodiment, if the number of blocks to use to store the SBM that is provided for one recording layer Li-1 (where i is an integer that is equal to or greater than one) is $M_i$ (which satisfies $1 \leq M_i$) and if $M_i$ is equal to or greater than two, then the $1^{st}$ through $M_i^{th}$ SBMs are stored on a series of $M_i$ blocks.

By performing a write operation in this manner, even if an SBM provided for one recording layer needs to be divided into a number of SBMs that should be stored on multiple blocks, those SBMs will be stored on consecutive blocks, and therefore, can be retrieved continuously from those blocks and can be easily obtained at a time.

On top of that, by writing the data on those $M_i$ consecutive blocks, the circumferential locations of those $M_i$ blocks on the information recording medium can be different from each other. Generally speaking, information is written spirally on an information recording medium. That is why if the data were written on discrete blocks, instead of the $M_i$ consecutive blocks, some of those $M_i$ blocks could have substantially the same circumferential locations on the information recording medium depending on the blocks' positions at which the data has been written. This problem is highly likely to arise on the inner area of an information recording medium where the circumference is short. If all of those $M_i$ blocks were positioned at substantially the same circumferential location and if there was any defect such as dust or a scratch at that circumferential location, then almost all of those $M_i$ blocks would turn into defective blocks and no data could be retrieved from them anymore. On the other hand, if the data is written on the $M_i$ consecutive blocks and if the $M_i$ blocks have mutually different circumferential locations on the information recording medium, those $M_i$ blocks would be much less affected by dust, scratches or any other kind of defect.

On the DMA, the disc management information indicating the final status and the defect management information will be copied among various pieces of management information in the TDMA. When data is going to be retrieved from the TDMA and then written on the DMA, the L1 layer's disc management information is stored in only one block and no information is stored on the second block according to the state of the TDMA shown in FIG. 3. In that case, nothing may be written on the second block 1514, 1524 or 1004 and the second block may be kept unrecorded as shown in FIGS. 15(B) and 15(C) and FIG. 10.

As can be seen, in the examples illustrated in FIGS. 15(B) and 15(C) and FIG. 10, even if there is no SBM to be stored on the second block, unrecorded areas 1514, 1522, 1524 and 1004 are left intentionally, instead of storing the disc management information with no spaces left between two adjacent blocks.

That is to say, according to the information writing method and apparatus of this preferred embodiment, if the largest user data area is allocated to an $i^{th}$ recording layer Li-1 (where $1 \leq i \leq n$) among the $1^{st}$ through $n^{th}$ recording layers L0 through Ln-1 of the information recording medium and if the number of blocks to use to store the SBM is $N_i$ (where $2 \leq N_i$) and if the number of blocks to use to store the actual SBM is $M_i$ (where $1 \leq M_i \leq N_i$) and if $M_i$ is equal to or greater than two, first of all, disc management information including the DDS and the SBM is written on the $M_i$ consecutive blocks. But the ($N_i$-$M_i$) blocks that follow the $M_i$ blocks are left unrecorded. And then the SBM of the $(i+1)^{th}$ recording layer Li starts to be written on the next block. It should be noted that if $M_i=N_i$ as shown in FIG. 15(A), then there will be no unrecorded areas (or blocks) left.

By performing a write operation in this manner, even if the size of the disc management information varies with that of the user data area (or the sizes of the spare areas), the first one of $M_{i+1}$ blocks of the disc management information for the $(i+1)^{th}$ recording layer will always be written at the same location (or block) in each DMA.

Comparing FIGS. 15(A), 15(B) and 15(C) to each other, it can be seen easily that even if the size of the disc management information for the recording layer L0 is variable (e.g., may be two blocks in FIGS. 15(A) and 15(B) but may be one block in FIG. 15(C)), the first SBM for the L1 layer, which is the first block of the disc management information for the recording layer L1, is always written at the same location 1503, 1513, 1523 in the DMA, which is the third block as counted from the top of the area.

As described above, the size of the disc management information depends on the size of the SBM, which in turn depends on the size of the user data area that is determined by that of the spare areas. For that reason, to determine the size of the disc management information, the size of the spare areas, which is defined by the DDS, needs to be obtained.

When the DMA is scanned, however, the DDS has not been retrieved yet, and therefore, the size of the disc management information cannot be determined just yet. Even if the DDS is always written at the first block of a part of the DMA that stores the disc management information, the DDS of that first block could not be obtained due to the presence of some defect such as dust or a scratch.

As can be seen, the DDS and the SBM have mutual dependence. That is to say, unless the DDS can be obtained, the size of the SBM cannot be determined. And unless the size of the SBM can be determined, the DDS cannot be obtained. For that reason, it is not easy to get the disc management information.

Thus, to overcome such a problem, according to this preferred embodiment, as disc management information for the $i^{th}$ recording layer Li-1, disc management information, including the DDS and the SBM, is written on $M_i$ consecutive blocks, first of all. Next, $(N_i-M_i)$ blocks that follow the first $M_i$ blocks are left unrecorded. And then the SBM of the $(i+1)^{th}$ recording layer Li starts to be written from the next block. According to this writing method, the first one of the $M_i$ blocks that store the disc management information is always located at the same position (block) in the DMA, irrespective of the size of the SBM.

As a result, no matter what size the SBM has, at least one block of the disc management information including the DDS (i.e., the first one of the $M_i$ blocks that store the disc management information) can always be located. Consequently, the disc management information including the DDS can be obtained easily, irrespective of the size of the SBM.

Next, it will be described how to scan a DMA and obtain management information from it in a situation where a BD-R, on which the information has been written on the DMA as shown in FIG. 15, is inserted into a drive and loaded.

Suppose the drive is attempting to scan all four blocks that store the disc management information at a time to get the disc loading process done in a shorter time. In that case, the drive can scan them at a time in the situation shown in FIG. 15(A) because all of those four blocks are already recorded. However, the drive cannot scan them at a time in the situation shown in FIG. 15(B) or 15(C) because an unrecorded area is included there.

Nevertheless, if the drive attempted to scan those blocks one by one, then even those unrecorded areas not to be scanned would also be scanned anyway and a seek (i.e., a move between areas) should be done every time a scan is started block by block in the situation shown in FIG. 15(B) or 15(C). Consequently, it would take a lot more time to get the disc loading process done in that case.

As can be seen, if the disc management information is stored with some unrecorded areas left, it could take a lot of time to retrieve the disc management information.

Thus, to overcome such a problem, according to the information writing method and apparatus of this preferred embodiment, if the largest user data area is allocated to an $i^{th}$ recording layer Li-1 (where $1 \le i \le n$) among the $1^{st}$ through $n^{th}$ recording layers L0 through Ln-1 of the information recording medium and if the number of blocks to use to store the SBM is $N_i$ (where $2 \le N_i$) and if the number of blocks to use to store the actual SBM is $M_i$ (where $1 \le M_i \le N_i$) and if $M_i$ is equal to or greater than two, first of all, disc management information including the DDS and the SBM is written on the $M_i$ consecutive blocks. Next, information including the DDS may be written on $(N_i-M_i)$ blocks that follow the $M_i$ blocks. It should be noted that the DDS could be written at the first sector of each of the $(N_i-M_i)$ blocks.

According to such a writing method, the disc management information will be written without leaving any unrecorded blocks, and therefore, can be retrieved in a shorter time.

In addition, according to this technique, the DDS is written on each and every block that stores the disc management information. Thus, the DDS that is an important piece of information to perform a read/write operation can be written on a much greater number of blocks, and therefore, this information recording medium can be protected more perfectly against a defect such as dust or a scratch. Furthermore, in a situation where the DDS is always written on the first block of that part of the DMA that stores the disc management information, the DDS could not be retrieved from the first block due to the presence of a defect such as dust or a scratch. Even so, since the DDS is also stored in the second, third and all the other blocks that follow the first block, the DDS can be easily located and obtained.

The DDS carries information of one sector, whereas one block (also called "one cluster") consists of 32 sectors. That is why even if the DDS is written on each of the $(N_i-M_i)$ blocks, the remaining 31 sectors can still be used to store anything else.

Thus, in the information writing method and apparatus of this preferred embodiment, data of zeros may be stored in the remaining sectors other than the one on which the DDS has been written.

For example, the DDS may be written on the first sector of one block and data of zeros may be written on the other sectors that follow it. The block 1004 shown in FIG. 10 has such an arrangement.

In the arrangement described above, the DDS and data of zeros are supposed to be written on the $(N_i-M_i)$ blocks. However, the present invention is in no way limited to that specific preferred embodiment. For example, the data of zeros may be replaced with FFh data. Or any other values may be written there except the physical addresses assigned to the disc.

Nevertheless, it is preferred that the DDS and data of zeros be written on those $(N_i-M_i)$ blocks because SBMs should be stored in some of those $(N_i-M_i)$ blocks. This is because if the information written on some of those blocks were recognized to be bitmap information, there should be no user data area to be designated by that bit. However, as bitmap information of zero indicates that its designated area is an unrecorded one and bitmap information of one indicates that its designated area is a recorded one, that user data area should be determined to be an unrecorded one and no information would be retrieved from it.

Alternatively, some meaningful information such as SBMs may be stored in the $(N_i-M_i)$ blocks instead of the invalid data. For example, in FIGS. 15(B) and 15(C), the unrecorded areas 1514, 1522 and 1524 may be replaced with L1 layer SBM, L0 layer SBM and L1 layer SBM, respectively. In that case, the SBMs are stored in multiple different locations, and therefore, the disc can be protected more perfectly against some defect such as dust or a scratch.

Still alternatively, SBM headers may be written on those $(N_i-M_i)$ blocks. Then, the SBM headers can be easily distinguished from the SBMs themselves. In that case, if the size of the bitmap information is set to be zero or if the first physical address of the area managed by the SBM is invalid location information, then it can be determined, during reading, that the SBM stored there is invalid.

Also, according to the information writing method and apparatus of this preferred embodiment, in a situation where the largest user data area is allocated to each of the $1^{st}$ through $n^{th}$ recording layers L0 through Ln-1, which are multiple recording layers that the information recording medium has, the numbers of blocks to use to store the SBMs on the respective layers are supposed to be $N_1, N_2, \ldots$ and $N_n$, respectively. In that case, the DDS 400 includes $N_1$ pieces of SBM location information, $N_2$ pieces of SBM location information, ... and $N_n$ pieces of location information as SBM location information for the respective recording layers L0 through Ln-1. Also, in that case, invalid location information will be written on blocks with no SBMs.

As can be seen, if the DDS includes location information about respective blocks with SBMs, it can be determined, just by reference to the DDS, whether valid SBMs are stored or not. If only the location information indicating the storage locations of SBMs on respective recording layers is available as shown in FIG. 13, it is not until the size of the bitmap information of the SBM header is obtained that the size of the valid SBM is known. However, if the DDS includes the location information of respective blocks with SBMs and if the location information of a block with no valid SBM is zero, the validity of SBMs can be determined, without depending on the SBMs, just by reading the DOS and deciding whether the SBM location information is zero or not.

Figure 11:
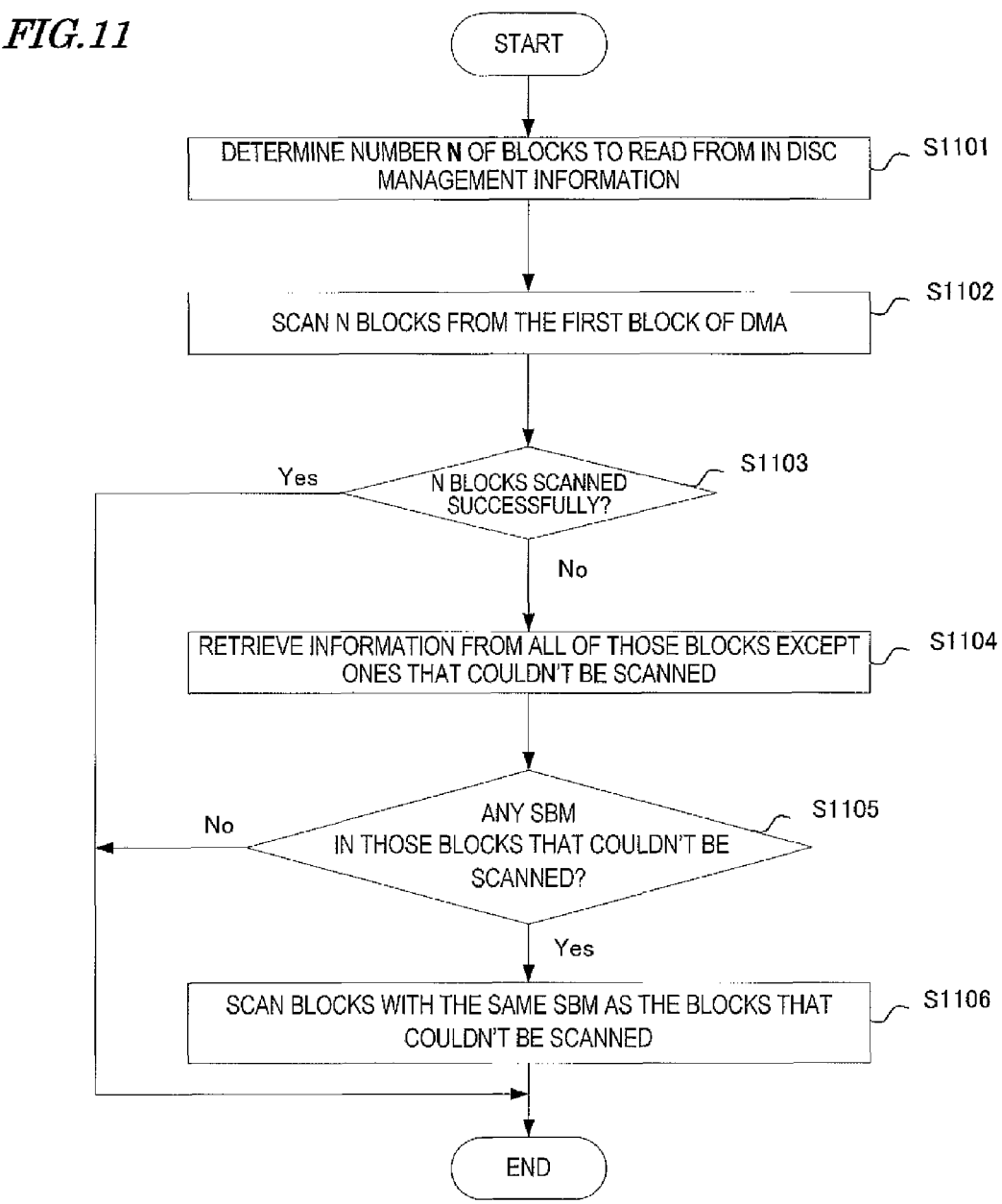
FIG. 11 is a flowchart showing how to perform a read operation on a DMA on which a write operation has been performed by a writing method according to a preferred embodiment of the present invention.
Figure 12:
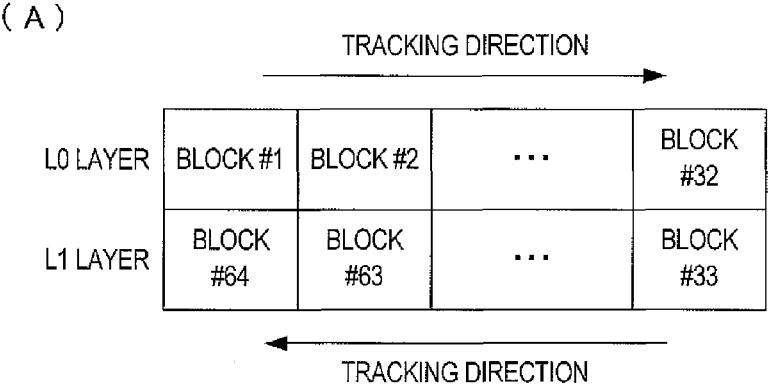
FIGS. 12(A) and 12(B) illustrate the arrangement of areas in a DMA of a conventional dual-layer BD-R.
Figure 12:
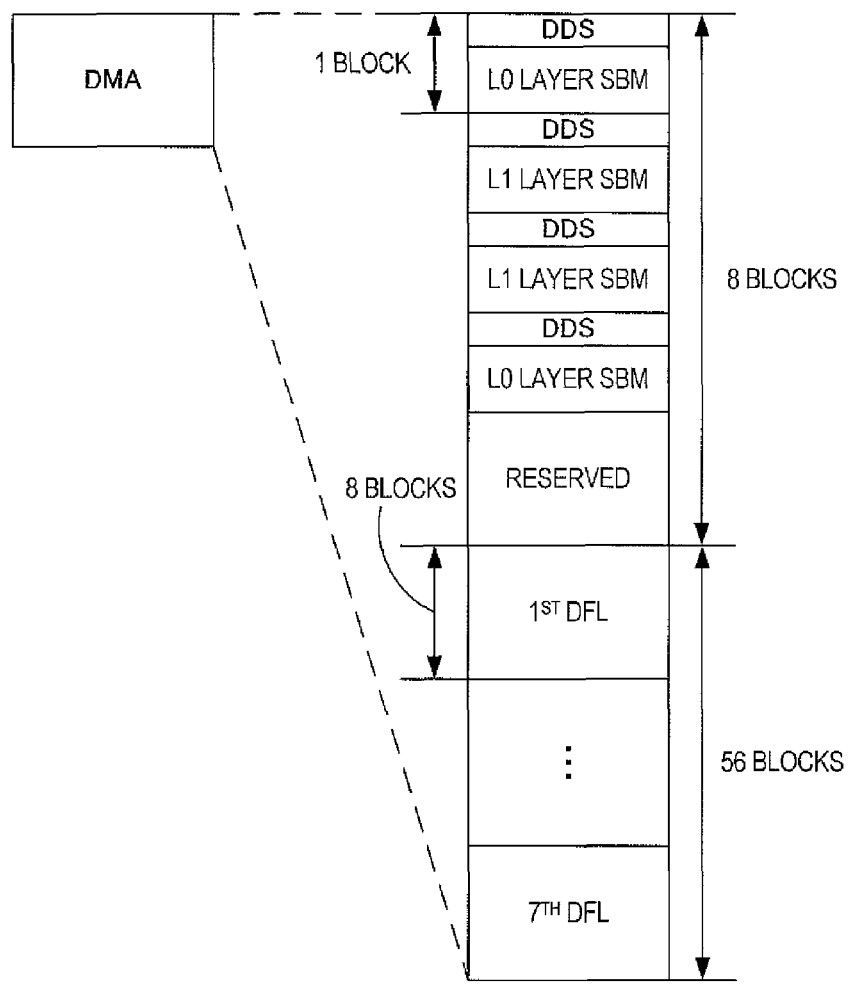

FIG. 11 is a flowchart showing the procedure of retrieving disc management information from the DMA of an information recording medium on which a write operation has been performed by the writing method according to this preferred embodiment of the present invention.

In this example, information is supposed to be stored in the DMA as shown in FIG. 10.

First of all, in Step 1101, the maximum block number determining section 575 determines the maximum number N of blocks of the disc management information. This processing step is the same as the processing step 701 shown in FIG. 7, and therefore, the description thereof will be omitted herein. In this preferred embodiment, N is four.

Next, in Step 1102, the management information reading control section 578 instructs the reading section 572 to scan N blocks as counted from the first block of the DMA and to store the information obtained from them in the management information storage memory 560.

Subsequently, in Step 1103, the management information reading control section 578 determines whether or not all of those N blocks have been scanned successfully in the previous processing step 1102. For example, suppose the reading section 572 has the ability to return the number of such blocks that have been scanned successfully to the management information reading control section 578. In that case, the management information reading control section 578 determines whether the number of scanned blocks that has been returned by the reading section 572 is four or not. If not all of those blocks have been scanned successfully (i.e., if the answer to the query of this processing step 1103 is NO), then not all of the disc management information has been retrieved yet, and therefore, the process advances to Step 1104. On the other hand, if all of those blocks have been scanned successfully (i.e., if the answer to the query of the processing step 1103 is YES), then all of the disc management information has already been retrieved, and therefore, the process ends.

Thereafter, in Step 1104, the management information reading control section 578 instructs the reading section 572 to retrieve information from all of those blocks, except the ones that have not been scanned successfully. For example, if the block 1002 has not been scanned successfully in FIG. 10, information is retrieved from the other two blocks as counted from the block 1003.

Next, in Step 1105, the management information reading control section 578 determines whether or not there is an SBM in the block that has not been scanned successfully in Step 1102. Specifically, the management information reading control section 578 determines that number of blocks that have not been scanned successfully by the number of scanned blocks that has been returned by the reading section 572 in Step 1101 (or Step 701). For example, if the block 1002 has not been scanned successfully in FIG. 10, then the number of scanned blocks that has been returned by the reading section 572 in Step 1101 (or Step 701) is one. Consequently, the block that has not been scanned successfully can be determined to be the second block 1002. Next, the management information reading control section 578 gets the SBM location information that is stored in the block that has not been scanned successfully from the DDS. For example, in FIG. 10, if the block 1002 has not been scanned successfully, L0 layer second SBM location information is obtained from the DDS. Then, the management information reading control section 578 determines whether the SBM location information thus obtained is zero or not. If the SBM location information is zero, then the control section 578 determined that there be no SBMs in the block that has not been scanned successfully. On the other hand, unless the SBM location information is zero, the control section 578 determines that there be an SBM in the block that has not been scanned successfully. If there is an SBM (i.e., if the answer to the query of the processing step 1105 is YES), the process advances to Step 1106 to scan another area. On the other hand, if there are no SBMs (i.e., if the answer to the query of the processing step 1105 is NO), then every piece of the disc management information has already been obtained, and therefore, the process ends. In Step 1104, since the remaining blocks are scanned, there will always be a DDS there, and therefore, the SBM location information can be obtained from the DOS.

Finally, in Step 1106, the management information reading control section 578 instructs the reading section 572 to scan a block that stores the same SBM as that of the block that has not been scanned successfully. For example, supposing the block 1002 has not been scanned successfully in FIG. 10, the block 1008 that stores the same SBM is scanned. Since every piece of disc management information has been obtained in this manner, the process ends.

It should be noted that if it has been determined in the processing step 1103 that some blocks have not been scanned successfully, the processing to cope with such a situation does not always have to be performed as described above. For example, if the same SBM has been written a number of times as shown in FIG. 10, then the maximum number of blocks may be scanned from the first block on which the same SBM starts to be written repeatedly next time. Specifically, if the block 1002 shown in FIG. 10 has not been scanned successfully, N blocks may be scanned from the block 1005 on.

Still alternatively, the block that has not been scanned successfully could be scanned again.

Also, once the DMA is defined, a write-once information recording medium turns into a read-only one. That is why even if the SBM has not been obtained successfully, the read operation will just be performed on an unrecorded area and data in no area will be destroyed by overwriting, unlike a situation where a write operation is performed. For that reason, if it has been determined in Step 1103 that any blocks have not been scanned successfully but if the DDS has already been obtained, then the process may end at that point in time.

As described above, according to the DMA scanning method of this preferred embodiment of the present invention, the maximum number of blocks of the disc management information is determined and disc management information is retrieved from a DMA based on the maximum number of blocks of the disc management information. That is why no information about the DDS is needed, and even if the size of an SBM changes, that of the disc management information to retrieve does not change. Consequently, the disc management information can still be read without depending on the information about the DDS or the size of the SBMs. That is to say, a read operation can be performed with mutual dependence between the DDS and the SBM eliminated.

On top of that, by storing, in the DDS, the SBM location information of each block on which the SBM has been written and by determining, by reference to the SBM location information, whether or not the SBM has been written there, the decision can be made only by the DDS without depending on the SBM.

Furthermore, as there are no unrecorded areas in the range in which the disc management information is going to be written, disc management information can be retrieved without a break from the maximum number of blocks, and therefore, no time needs to be spent to get a seek operation done. As a result, the disc loading operation can get done in a shorter time.

In addition, even in the sequential recording mode, the disc management information is written on the same number of blocks as in the random recording mode, and therefore, reading can get done by the same method even if the recording mode is different.

Hereinafter, the information reading method and the configuration and operation of the information reading apparatus according to this preferred embodiment will be described in further detail.

In the information recording medium of this preferred embodiment, if the number of blocks to use to store the SBM that is provided for one recording layer Li-1 (where is an integer that is equal to or greater than one) is $M_i$ (which satisfies $1 \leq M_i$) and if $M_i$ is equal to or greater than two, then the SBM is divided into the $1^{st}$ through $M_i^{th}$ SBMs, each of which has a size that is still equal to or smaller than one block even when combined with the DDS and stored in an associated one of the $M_i$ blocks.

And according to the information reading method and apparatus of this preferred embodiment, the SBM for that one recording layer Li-1 is retrieved from the $M_i$ blocks.

According to such a technique, the disc management information can still be stored in the DMA, managed, and retrieved from it, even if the size of the bitmap information varies with that of the user data area (i.e., the size of the spare area) and if the SBM cannot be stored in one block.

In the information recording medium of this preferred embodiment, if the largest user data area is allocated to an $i^{th}$ recording layer Li-1 (where $1 \leq i \leq n$) among the $1^{st}$ through $n^{th}$ recording layers L0 through Ln-1 of the information recording medium and if the number of blocks to use to store the SBM is $N_i$ (where $2 \leq N_i$) and if the number of blocks to use to store the actual SBM is $M_i$ (where $1 \leq M_i \leq N_i$) and if $M_i$ is equal to or greater than two, first of all, disc management information including the DDS and the SBM is written on the $M_i$ consecutive blocks. But the ($1 \leq M_i \leq N_i$) blocks that follow the $M_i$ blocks are left unrecorded. And then the SBM of the $(i+1)^{th}$ recording layer Li starts to be written on the next block.

And according to the information reading method and apparatus of this preferred embodiment, the SBM for the $(i+1)^{th}$ recording layer Li is retrieved from $(N_i-M_i)$ blocks that follow the $M_i$ blocks.

According to such a method, at least one block that stores the disc management information including the DDS (e.g., the first one of the $M_i$ blocks that store the disc management information) can always be located irrespective of the size of the SBM. Consequently, disc management information such as the DDS can be obtained easily irrespective of the size of the SBM.

Hereinafter, a method of making an information recording medium according to this preferred embodiment will be described.

First of all, first through $n^{th}$ recording layers, each of which has tracks to write an information signal (such as an address signal or control data) on, are formed on a disc substrate. In this manner, recording layers, in each of which the user data area, defect management areas and spare areas are arranged as shown in FIG. 1, can be obtained. Optionally, a spacer layer may be interposed between two adjacent ones of the recording layers. Furthermore, the recording layers may be coated with a cover layer, too.

An information recording medium making method according to this preferred embodiment includes the steps of: forming $1^{st}$ through $n^{th}$ recording layers (where n is an integer that satisfies $n \geq 1$); defining $1^{st}$ through $n^{th}$ user data areas to write user data on in the $1^{st}$ through $n^{th}$ recording layers, respectively; and defining a disc management area to store disc management information about the information recording medium on at least one of the $1^{st}$ through $n^{th}$ recording layers.

Another information recording medium making method according to this preferred embodiment includes the steps of: forming $1^{st}$ through $n^{th}$ recording layers (where n is an integer that satisfies $n \geq 1$); defining data areas, which include $1^{st}$ through $n^{th}$ user data areas to write user data on and spare areas to provide a replacement for any defective part of the user data areas, in the $1^{st}$ through $n^{th}$ recording layers, respectively; and defining a disc management area to store disc management information about the information recording medium on at least one of the $1^{st}$ through $n^{th}$ recording layers.

INDUSTRIAL APPLICABILITY

An information recording medium according to the present invention can be used as a write-once optical disc, on which a write operation can be performed at random on any arbitrary range, and information reading and writing methods according to the present invention is applicable to an optical disc drive that can read and write from/to a write-once optical disc on which a write operation can be performed at random on any arbitrary range.

REFERENCE SIGNS LIST

100 information recording medium
200 SBM
201 SBM header
202 bitmap information
300 TDMA
301 L0 layer $1^{st}$ SBM
303 L0 layer $2^{nd}$ SBM
305 TDFL
307 L1 layer SBM
302, 304, 306, 308 TDDS
400, 1300 DDS
401: L0 layer $1^{st}$ SBM location information

402: L0 layer $2^{nd}$ SBM location information
403: L1 layer $1^{st}$ SBM location information
404: L1 layer $2^{nd}$ SBM location information
500 information reading/writing apparatus
510 instruction processing section
520 optical head
530 laser control section
540 mechanism control section
550 memory
560 management information storage memory
570 system control section
571 writing section
572 reading section
573 management information updating section
574 management information generating section
575 maximum block number determining section
576 disc information retrieving section
577 management information writing control section
578 management information reading control section
580 I/O bus
1000 DMA
1001, 1007 DDS+L0 layer $1^{st}$ SBM
1002, 1008 DDS+L0 layer $2^{nd}$ SBM
1003, 1005 DDS+L1 layer SBM
1004, 1006 DDS+ALL 0
1301 DDS header
1302 writing mode information
1303 user data area's logical last sector address
1304 L0 layer inner spare area size
1305 outer spare area size
1306 L1 layer inner spare area size
1307 $1^{st}$ DFL location information
1308 $8^{th}$ DFL location information
1309 L0 layer SBM location information
1310 L1 layer SBM location information

The invention claimed is:

1. A write-once information recording medium on which a read/write operation is performed on a block-by-block basis, comprising:

$1^{st}$ through $n^{th}$ recording layers (where n is an integer that satisfies n≥1), wherein the $1^{st}$ through $n^{th}$ recording layers have $1^{st}$ through $n^{th}$ user data areas to write user data on, and at least one of the $1^{st}$ through $n^{th}$ recording layers has a disc management area to store disc management information about the information recording medium, wherein the disc management information includes:

a disc definition structure for use to manage the data structure of the information recording medium, and $1^{st}$ through $n^{th}$ space bitmaps for use to manage the recording statuses of the $1^{st}$ through $n^{th}$ user data areas, wherein each of the $1^{st}$ through $n^{th}$ space bitmaps includes bitmap information for use to manage the recording status of its associated one of the $1^{st}$ through $n^{th}$ user data areas on a block-by-block basis, and wherein if in a situation where the largest space is allocated to an $i^{th}$ user data area (where i is an integer that falls within the range 1≤i≤n), the number of blocks to use to store the $i^{th}$ space bitmap is $N_i$ (where $N_i$ is an integer that satisfies $N_i \geq 2$), and if the number of blocks to use to store the $i^{th}$ space bitmap for the $i^{th}$ user data area of an actual size is $M_i$ (where $M_i$ is an integer that satisfies $1 \leq M_i \leq N_i$) and if $M_i$ is equal to or greater than two, then the $i^{th}$ space bitmap is divided into the $1^{st}$ through $M_i^{th}$ space bitmaps, each of which has a size that is still equal to or smaller than one block even when combined with the disc definition structure, and stored in an associated one of the $M_i$ blocks in the disc management area, wherein the disc definition structure is recorded on the first sector of each of the $M_i$ blocks, the $M_i$ blocks are consecutive blocks, and n is equal to or greater than two, and wherein $M_{i+1}$ blocks, including the $(i+1)^{th}$ space bitmap for use to manage the recording status of the $(i+1)^{th}$ user data area, start to be written on the block after $(N_i - M_i)$ blocks that follow the $M_i$ blocks.

2. A method for writing information on a write-once information recording medium on which a read/write operation is performed on a block-by-block basis, the information recording medium including $1^{st}$ through $n^{th}$ recording layers (where n is an integer that satisfies n≥1), wherein the $1^{st}$ through $n^{th}$ recording layers have $1^{st}$ through $n^{th}$ user data areas to write user data on, and at least one of the $1^{st}$ through $n^{th}$ recording layers has a disc management area to store disc management information about the information recording medium, wherein the disc management information includes a disc definition structure for use to manage the data structure of the information recording medium, and $1^{st}$ through $n^{th}$ space bitmaps for use to manage the recording statuses of the $1^{st}$ through $n^{th}$ user data areas, wherein each of the $1^{st}$ through $n^{th}$ space bitmaps includes bitmap information for use to manage the recording status of its associated one of the $1^{st}$ through $n^{th}$ user data areas on a block-by-block basis, and wherein the information writing method comprises the steps of:

if in a situation where the largest space is allocated to an $i^{th}$ user data area (where i is an integer that falls within the range 1≤i≤n), the number of blocks to use to store the $i^{th}$ space bitmap is $N_i$ (where $N_i$ is an integer that satisfies $N_i \geq 2$), and if the number of blocks to use to store the $i^{th}$ space bitmap for the $i^{th}$ user data area of an actual size is $M_i$ (where $M_i$ is an integer that satisfies $1 \leq M_i \leq N_i$) and if $M_i$ is equal to or greater than two, dividing the $i^{th}$ space bitmap into the $1^{st}$ through $M_i^{th}$ space bitmaps, each of which has a size that is still equal to or smaller than one block even when combined with the disc definition structure, and storing each said space bitmap in an associated one of the $M_i$ blocks in the disc management area, and comprising the step of recording the disc definition structure on the first sector of each of the $M_i$ blocks, wherein the $M_i$ blocks are consecutive blocks and n is equal to or greater than two, and wherein $M_{i+1}$ blocks, including the $(i+1)^{th}$ space bitmap for use to manage the recording status of the $(i+1)^{th}$ user data area, start to be written on the block after $(N_i - M_i)$ blocks that follow the $M_i$ blocks.

3. A method for reading information from a write-once information recording medium on which a read/write operation is performed on a block-by-block basis, the information recording medium including $1^{st}$ through $n^{th}$ recording layers (where n is an integer that satisfies n≥1), wherein the $1^{st}$ through $n^{th}$ recording layers have $1^{st}$ through $n^{th}$ user data areas to write user data on, and at least one of the $1^{st}$ through $n^{th}$ recording layers has a disc management area to store disc management information about the information recording medium, wherein the disc management information includes a disc definition structure for use to manage the data structure of the information recording medium, and $1^{st}$ through $n^{th}$ space bitmaps for use to manage the recording statuses of the $1^{st}$ through $n^{th}$ user data areas, wherein each of the $1^{st}$ through $n^{th}$ space bitmaps includes bitmap information for use to manage the recording status of its associated one of the $1^{st}$ through $n^{th}$ user data areas on a block-by-block basis, and wherein if in a situation where the largest space is allocated to an $i^{th}$ user data area (where i is an integer that falls within the range $1 \le i \le n$), the number of blocks to use to store the $i^{th}$ space bitmap is $N_i$ (where $N_i$ is an integer that satisfies $N_i \ge 2$), and if the number of blocks to use to store the $i^{th}$ space bitmap for the $i^{th}$ user data area of an actual size is $M_i$ (where $M_i$ is an integer that satisfies $1 \le M_i \le N_i$) and if $M_i$ is equal to or greater than two, then the $i^{th}$ space bitmap is divided into the $1^{st}$ through $M_i^{th}$ space bitmaps, each of which has a size that is still equal to or smaller than one block even when combined with the disc definition structure, and each said space bitmap is stored in an associated one of the $M_i$ blocks in the disc management area, and wherein the information reading method comprises the step of:

retrieving the $i^{th}$ space bitmap from the $M_i$ blocks, wherein the disc definition structure is recorded on the first sector of each of the $M_i$ blocks, the $M_i$ blocks are consecutive blocks, n is equal to or greater than two, and $M_{i+1}$ blocks, including the $(i+1)^{th}$ space bitmap for use to manage the recording status of the $(i+1)^{th}$ user data area, start to be written on the block after $(N_i-M_i)$ blocks that follow the $M_i$ blocks, and wherein the $(i+1)^{th}$ space bitmap is retrieved from the block after the $(N_i-M_i)$ blocks that follow the $M_i$ blocks.

4. An apparatus for writing information on a write-once information recording medium on which a read/write operation is performed on a block-by-block basis, the information recording medium including $1^{st}$ through $n^{th}$ recording layers (where n is an integer that satisfies $n \ge 1$), wherein the $1^{st}$ through $n^{th}$ recording layers have $1^{st}$ through $n^{th}$ user data areas to write user data on, and at least one of the $1^{st}$ through $n^{th}$ recording layers has a disc management area to store disc management information about the information recording medium, wherein the disc management information includes a disc definition structure for use to manage the data structure of the information recording medium, and $1^{st}$ through $n^{th}$ space bitmaps for use to manage the recording statuses of the $1^{st}$ through $n^{th}$ user data areas, wherein each of the $1^{st}$ through $n^{th}$ space bitmaps includes bitmap information for use to manage the recording status of its associated one of the $1^{st}$ through $n^{th}$ user data areas on a block-by-block basis, and wherein the information writing apparatus comprises a writing section configured such that:

if in a situation where the largest space is allocated to an $i^{th}$ user data area (where i is an integer that falls within the range $1 \le i \le n$), the number of blocks to use to store the $i^{th}$ space bitmap is $N_i$ (where $N_i$ is an integer that satisfies $N_i \ge 2$), and if the number of blocks to use to store the $i^{th}$ space bitmap for the $i^{th}$ user data area of an actual size is $M_i$ (where $M_i$ is an integer that satisfies $1 \le M_i \le N_i$) and if $M_i$ is equal to or greater than two, then the information writing apparatus divides the $i^{th}$ space bitmap into the $1^{st}$ through $M_i^{th}$ space bitmaps, each of which has a size that is still equal to or smaller than one block even when combined with the disc definition structure, and stores each said space bitmap in an associated one of the $M_i$ blocks in the disc management area, and the disc definition structure is recorded on the first sector of each of the $M_i$ blocks, wherein the $M_i$ blocks are consecutive blocks, and n is equal to or greater than two, and wherein $M_{i+1}$ blocks, including the $(i+1)^{th}$ space bitmap for use to manage the recording status of the $(i+1)^{th}$ user data area, start to be written on the block after $(N_i-M_i)$ blocks that follow the $M_i$ blocks.

5. An apparatus for reading information from a write-once information recording medium on which a read/write operation is performed on a block-by-block basis, the information recording medium including $1^{st}$ through $n^{th}$ recording layers (where n is an integer that satisfies $n \ge 1$), wherein the $1^{st}$ through $n^{th}$ recording layers have $1^{st}$ through $n^{th}$ user data areas to write user data on, and at least one of the $1^{st}$ through $n^{th}$ recording layers has a disc management area to store disc management information about the information recording medium, wherein the disc management information includes a disc definition structure for use to manage the data structure of the information recording medium, and $1^{st}$ through $n^{th}$ space bitmaps for use to manage the recording statuses of the $1^{st}$ through $n^{th}$ user data areas, wherein each of the $1^{st}$ through $n^{th}$ space bitmaps includes bitmap information for use to manage the recording status of its associated one of the $1^{st}$ through $n^{th}$ user data areas on a block-by-block basis, and wherein the information reading apparatus comprises a reading section configured such that:

if in a situation where the largest space is allocated to an $i^{th}$ user data area (where i is an integer that falls within the range $1 \le i \le n$), the number of blocks to use to store the $i^{th}$ space bitmap is $N_i$ (where $N_i$ is an integer that satisfies $N_i \ge 2$), and if the number of blocks to use to store the $i^{th}$ space bitmap for the $i^{th}$ user data area of an actual size is $M_i$ (where $M_i$ is an integer that satisfies $1 \le M_i \le N_i$) and if $M_i$ is equal to or greater than two, then the $i^{th}$ space bitmap is divided into the $1^{st}$ through $M_i^{th}$ space bitmaps, each of which has a size that is still equal to or smaller than one block even when combined with the disc definition structure, and each said space bitmap is stored in an associated one of the $M_i$ blocks in the disc management area, and the information reading apparatus retrieves the $i^{th}$ space bitmap from the $M_i$ blocks, wherein the disc definition structure is recorded on the first sector of each of the $M_i$ blocks, the $M_i$ blocks are consecutive blocks, n is equal to or greater than two, and $M_{i+1}$ blocks, including the $(i+1)^{th}$ space bitmap for use to manage the recording status of the $(i+1)^{th}$ user data area, start to be written on the block after $(N_i-M_i)$ blocks that follow the $M_i$ blocks, and wherein the $(i+1)^{th}$ space bitmap is retrieved from the block after the $(N_i-M_i)$ blocks that follow the $M_i$ blocks.

\* \* \* \* \*